United States Patent
Morales Teraoka

(10) Patent No.: US 9,969,390 B2
(45) Date of Patent: May 15, 2018

(54) LANE KEEPING CONTROL APPARATUS

(71) Applicant: TOYOTA JIDOSHA KABUSHIKI KAISHA, Toyota-shi, Aichi (JP)

(72) Inventor: Edgar Yoshio Morales Teraoka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/467,014

(22) Filed: Mar. 23, 2017

(65) Prior Publication Data

US 2017/0313309 A1  Nov. 2, 2017

(30) Foreign Application Priority Data

Apr. 27, 2016  (JP) ................. 2016-089599

(51) Int. Cl.
 *A01B 69/00* (2006.01)
 *B60W 30/12* (2006.01)
 *G06K 9/00* (2006.01)

(52) U.S. Cl.
 CPC ......... *B60W 30/12* (2013.01); *G06K 9/00798* (2013.01); *B60W 2420/42* (2013.01); *B60W 2710/18* (2013.01); *B60W 2710/20* (2013.01)

(58) Field of Classification Search
 CPC .............. B60W 30/12; B60W 2420/42; G06K 9/00798
 See application file for complete search history.

(56) References Cited

U.S. PATENT DOCUMENTS

| | | | |
|---|---|---|---|
| 2013/0238192 A1* | 9/2013 | Breu | G01S 13/726 701/41 |
| 2013/0345900 A1 | 12/2013 | Usui | |
| 2015/0371542 A1* | 12/2015 | Fujishiro | B60W 50/14 701/41 |
| 2016/0214612 A1* | 7/2016 | Kashiba | B60W 10/04 |
| 2017/0076606 A1* | 3/2017 | Gupta | B60K 35/00 |

FOREIGN PATENT DOCUMENTS

| | | |
|---|---|---|
| JP | 2011-073530 A | 4/2011 |
| WO | 2012/114433 A1 | 8/2012 |

* cited by examiner

*Primary Examiner* — Adam M Alharbi
(74) *Attorney, Agent, or Firm* — Sughrue Mion, PLLC

(57) ABSTRACT

A lane keeping control apparatus includes a selection unit configured to select an operational mode of lane keeping control from operational modes based on an approaching speed; and a control unit configured to execute the lane keeping control in the selected operational mode. The operational modes include a first operational mode in which a steering unit is operated, and in which a brake unit is not operated, and a second operational mode in which the steering unit is operated, and in which the brake unit is operated. If the approaching speed is less than a threshold value, the selection unit selects the first operational mode, and if the approaching speed is the threshold value or greater, the selection unit selects the second operational mode.

16 Claims, 15 Drawing Sheets

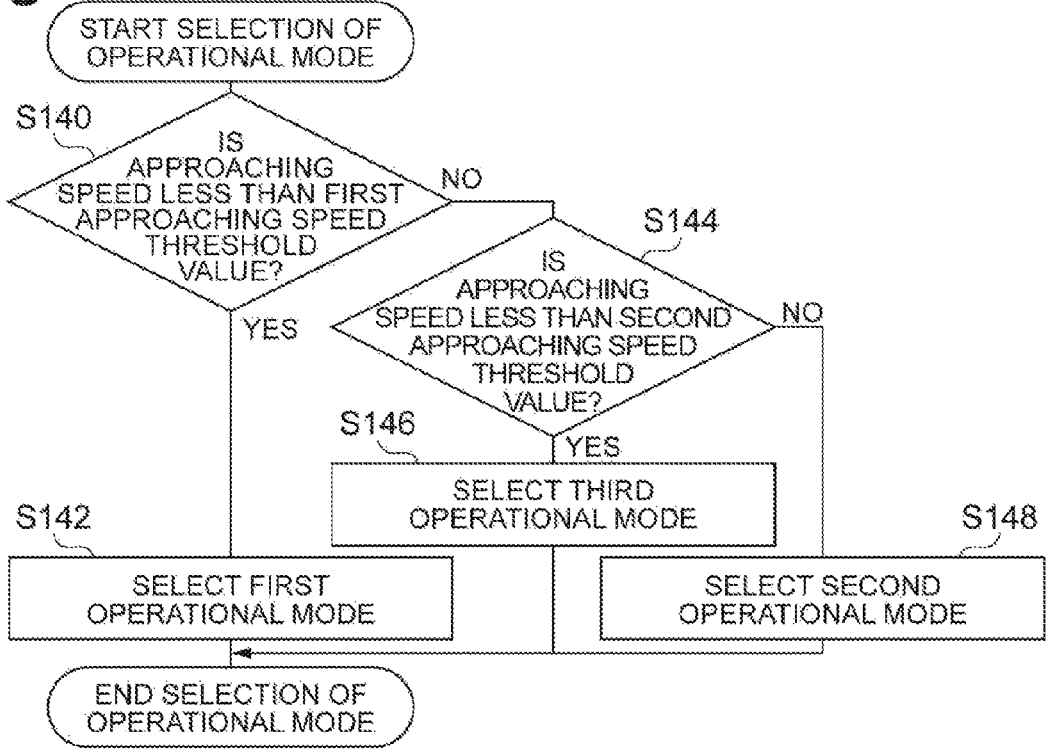
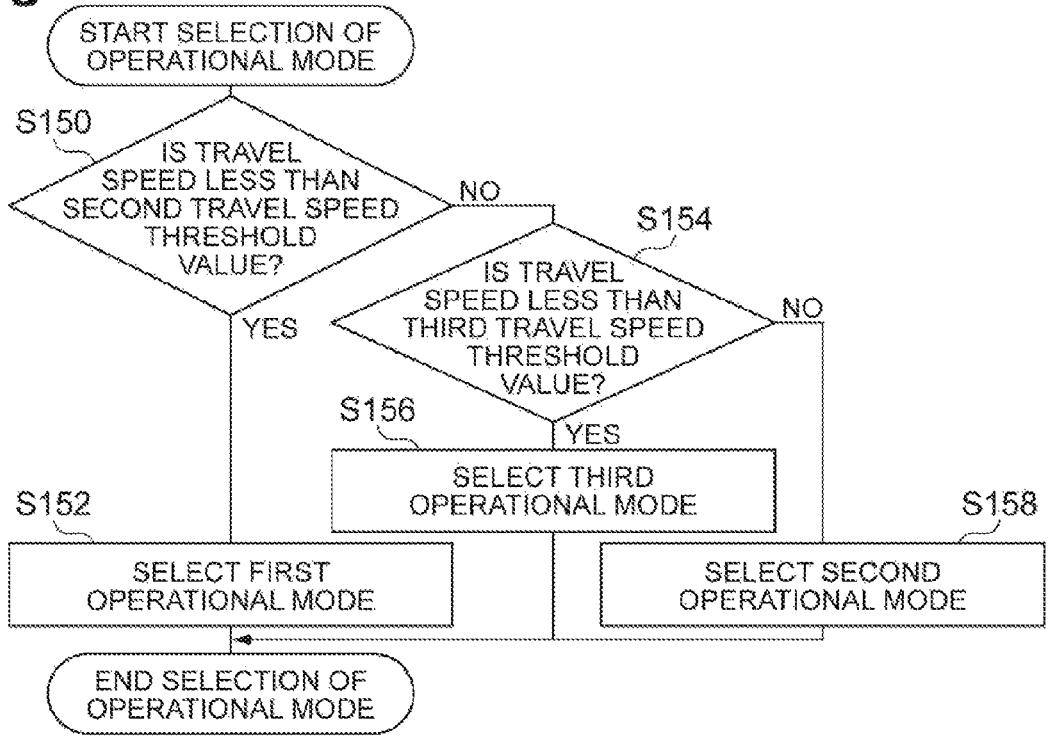

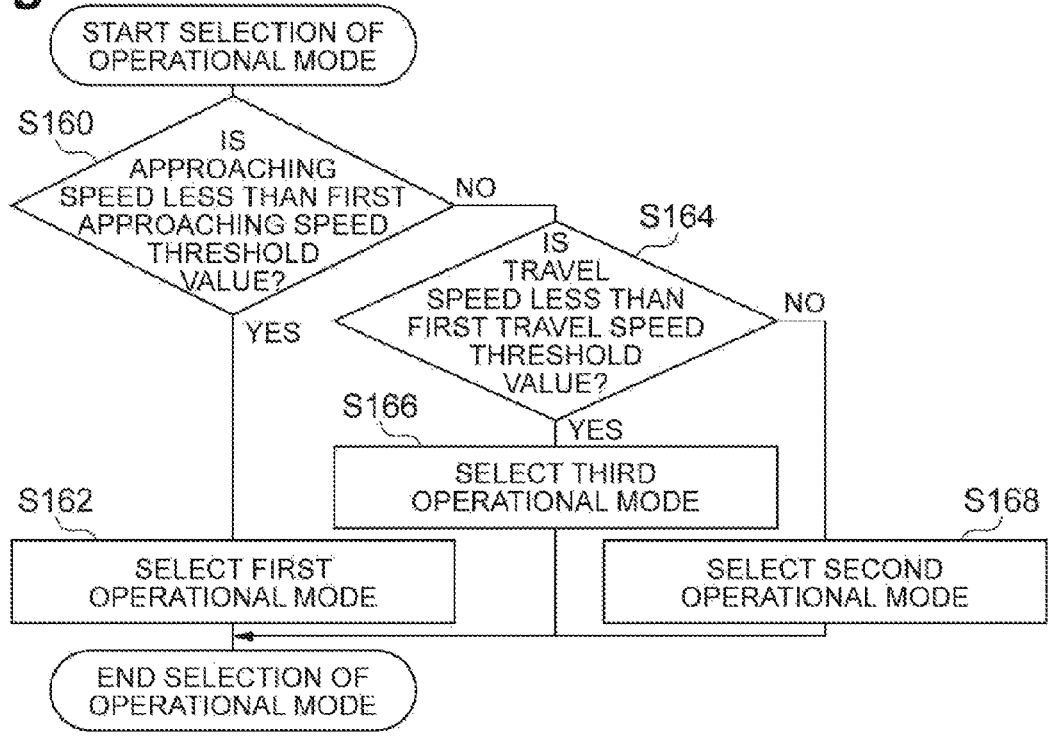
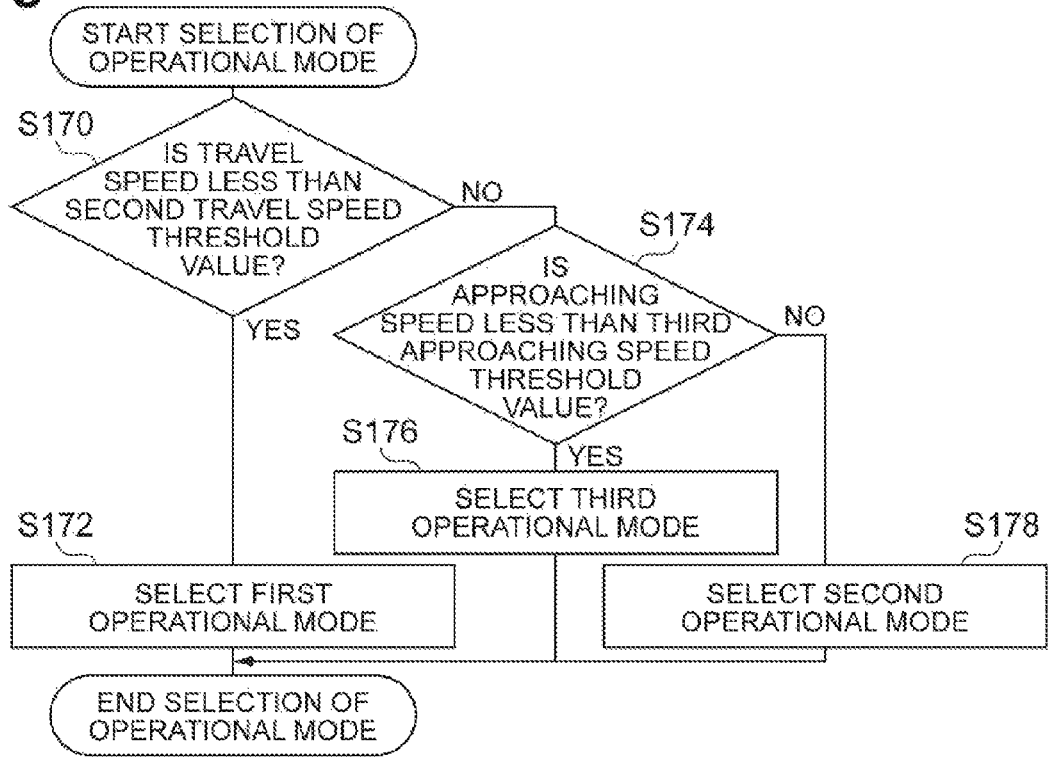

*Fig.14*

| CHARACTERISTIC OF LANE BOUNDARY LINE | RISK INDEX | MAP IDENTIFICATION NUMBER |
|---|---|---|
| YELLOW SOLID LINE | HIGH | 1 |
| YELLOW BROKEN LINE | SLIGHTLY LOW | 2 |
| WHITE SOLID LINE | SLIGHTLY HIGH | 3 |
| WHITE BROKEN LINE | LOW | 4 |
| DOUBLE LINE | HIGH | 1 |
| PHYSICAL BOUNDARY | HIGH | 1 |

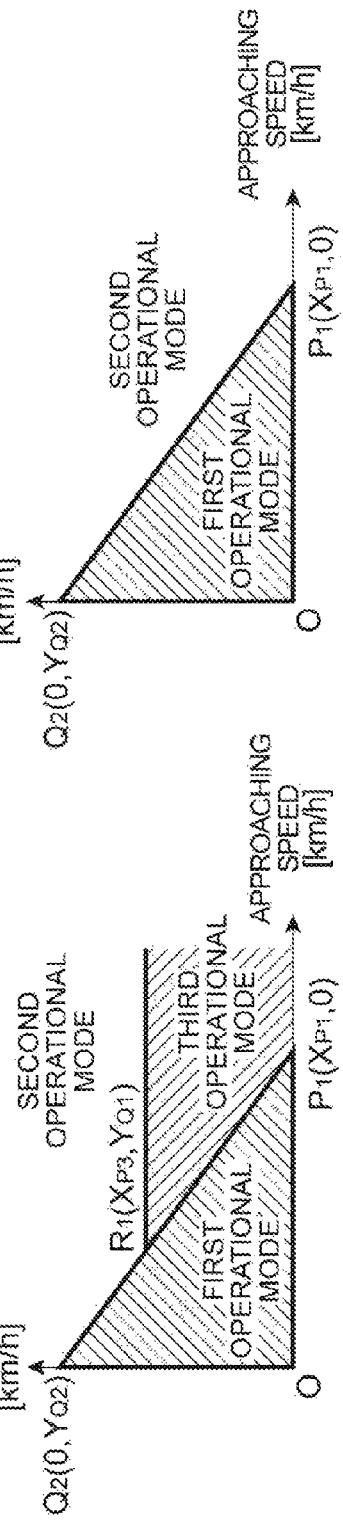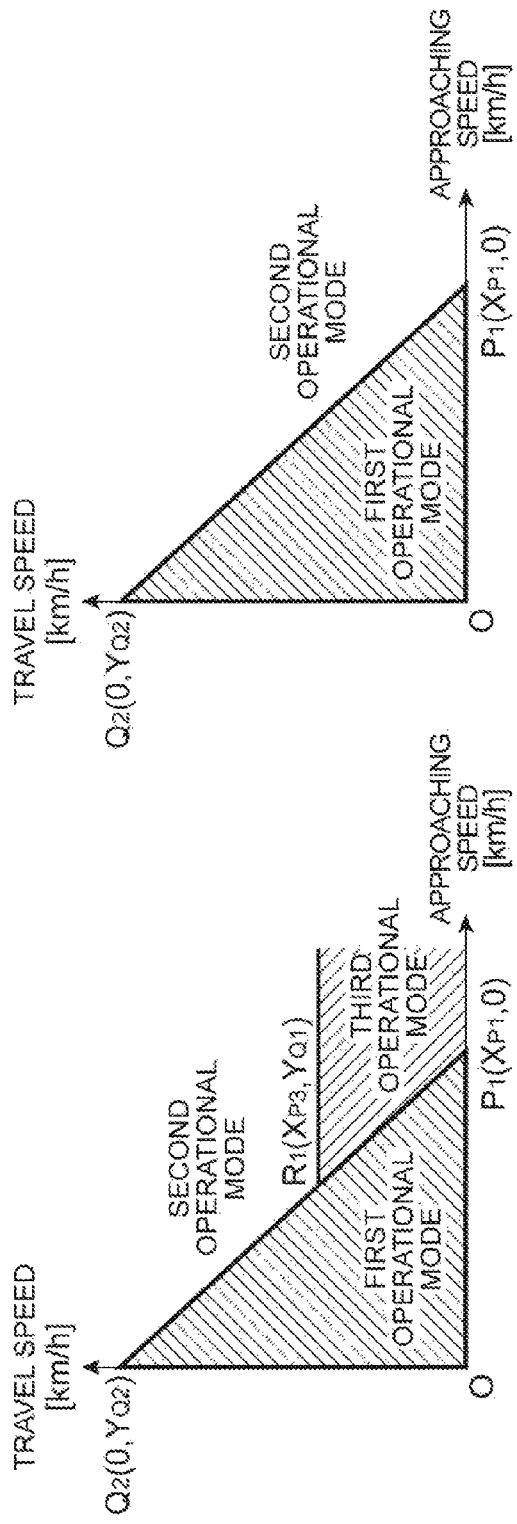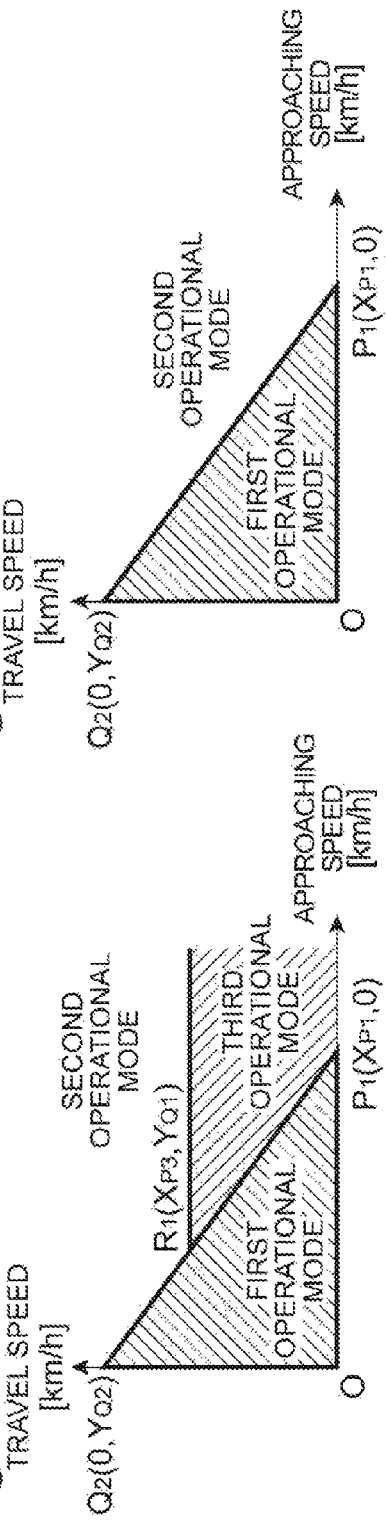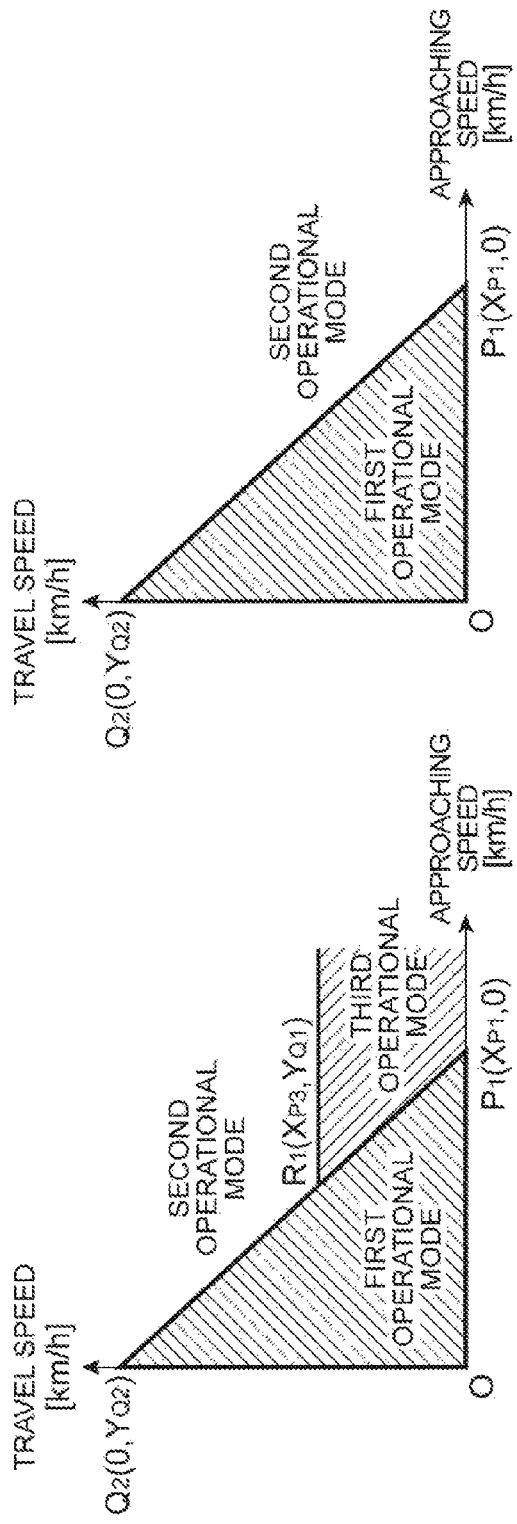

LANE KEEPING CONTROL APPARATUS

CROSS-REFERENCE TO RELATED APPLICATION

This application is based on Japanese Patent Application No, 2016-089599 filed with Japan Patent Office on Apr. 27, 2016, the entire contents of which are hereby incorporated by reference.

TECHNICAL FIELD

The present disclosure relates to a lane keeping control apparatus.

BACKGROUND

International Patent Publication No. WO 2012-114433 discloses a lane keeping control apparatus which performs control such that a vehicle keeps a travel lane. If the distance from the vehicle to a lane boundary is a predetermined threshold value or less, this apparatus determines that lane keeping control is to be started, and operates an electric power steering (EPS) system, or an electric control braking (ECB) system.

SUMMARY

The lane keeping control apparatus disclosed in International Patent Publication No. WO 2012-114433 is capable of changing a timing of start of lane keeping control in correspondence with a travel position, however, assistance content is uniform. For this reason, a lane keeping apparatus disclosed in international Patent Publication No. WO 2012-114433 may cause a driver to feel insecure or inconvenient. For example, if a vehicle speed or a lateral speed at which a vehicle approaches a lane boundary line is relatively high, when lane keeping control is executed only by steering control, a driver may feel insecure, which is a problem. If a vehicle speed or a lateral speed at which a vehicle approaches a lane boundary line is relatively low, when break control is executed, a driver may feel inconvenient. In this technical field, a lane keeping control apparatus, which can be operated such that a driver does not feel insecure or inconvenient, is desirable.

According to an aspect of the present disclosure, there is provided a lane keeping control apparatus that performs lane keeping control to prevent departure of a vehicle from a lane, the apparatus including: a sensor configured to acquire an image in an advancing direction of the vehicle; a recognition unit configured to recognize the lateral position of the vehicle in the lane based on the image; an acquisition unit configured to acquire an approaching speed that is a lateral speed at which the vehicle approaches a lane boundary line in a width direction of the lane; a determination unit configured to determine whether to execute the lane keeping control based on the lateral position; a selection unit configured to select an operational mode of the lane keeping control from a plurality of operational modes based on the approaching speed if the determination unit determines that the lane keeping control is to be executed; a control unit configured to execute the lane keeping control in the operational mode selected by the selection unit; a steering unit configured to apply a steering force to a steering wheel of the vehicle by being controlled by the control unit; and a brake unit configured to apply a brake force to wheels of the vehicle by being controlled by the control unit. The plurality of operational modes include a first operational mode in which the steering unit is operated such that the direction of the vehicle faces the center of the lane, and in which the brake unit is not operated, and a second operational mode in which the steering unit is operated such that the direction of the vehicle faces the center of the lane, and in which the brake unit is operated such that the speed of the vehicle is reduced. If the approaching speed is less than a first approaching speed threshold value, the selection unit selects the first operational mode, and if the approaching speed is the first approaching speed threshold value or greater, the selection unit selects the second operational mode.

If the approaching speed is less than the first approaching speed threshold value, the selection unit of the lane keeping control apparatus selects the first operational mode. If the approaching speed is the first approaching speed threshold value or greater, the selection unit selects the second operational mode. That is, if the approaching speed is somewhat low, the steering of the vehicle is controlled by a steering force applied to the steering wheel in a state where a brake force is not applied to the wheels. If the approaching speed is somewhat high, the steering of the vehicle is controlled by a steering force applied to the steering wheel in a state where a brake force is applied to the wheels. As such, the apparatus is capable of further reducing a feeling of insecurity to a driver by reducing the speed of the vehicle when the approaching speed is somewhat high, in comparison with that when the vehicle is controlled only by a steering force (that is, a brake force is not applied to the wheels). In addition, the apparatus is capable of further reducing a feeling of inconvenience to the driver by not reducing the speed of the vehicle when the approaching speed is somewhat low, in comparison with that when a brake force is applied to the wheels every times.

The first approaching speed threshold value may be set to a value smaller by the extent of an increase in travel speed of the vehicle. In this case, since a brake force is more likely to be applied to the wheels as the travel speed is increased, the apparatus is capable of further reducing a feeling of insecurity to a driver, and of further reducing a feeling of inconvenience to the driver.

The brake unit may be capable of independently applying a brake force to the right and left wheels of the vehicle. The plurality of operational modes may include a third operational mode in which the steering unit is not operated, and in which the brake unit is operated such that the direction of the vehicle faces the center of the lane. If the approaching speed is the first approaching speed threshold value or greater, and the travel speed of the vehicle is less than a first travel speed threshold value, the selection unit may select the third operational mode instead of the second operational mode. The third operational mode, in which the direction of the vehicle is controlled by a brake force, provides better vehicle responsiveness in comparison with that when the direction of the vehicle is controlled by a steering force. In contrast, if the third operational mode is active, a feeling of insecurity to a driver is high, and a feeling of inconvenience caused by being operated when unnecessary is high. As a result, the apparatus having the aforementioned configuration is capable of reducing a feeling of insecurity to a driver and of reducing a feeling of inconvenience to the driver while effectively preventing departure of the vehicle from the lane by limiting the operation of the third operational mode to when the travel speed is somewhat low and the approaching speed is somewhat high.

The brake unit may be capable of independently applying a brake force to the right and left wheels of the vehicle. The plurality of operational modes may include a third operational mode in which the steering unit is not operated, and in which the brake unit is operated such that the direction of the vehicle faces the center of the lane. If the approaching speed is the first approaching speed threshold value or greater, and is less than a second approaching speed threshold value, the selection unit may select the third operational mode instead of the second operational mode. As such, the apparatus is capable of further reducing a feeling of insecurity to a driver, and of further reducing a feeling of inconvenience to the driver by changing the operational mode in a stepwise manner in correspondence with the approaching speed.

The lane keeping control apparatus may further include a storage unit configured to store a characteristic of the lane boundary line and the first approaching speed threshold value while correlating the characteristic of the lane boundary line with the first approaching speed threshold value. The recognition unit also may acquire the characteristic of the lane boundary line. The selection unit may acquire the first approaching speed threshold value with reference to the storage unit based on the characteristic of the lane boundary line acquired by the recognition unit. In this case, the apparatus is capable of changing the first approaching speed threshold value in correspondence with a characteristic of a lane boundary line, for example, a solid line, a broken line, a curbstone, or a wall.

According to another aspect of the present disclosure, there is provided a lane keeping control apparatus that performs lane keeping control to prevent departure of a vehicle from a lane, the apparatus including: a sensor configured to acquire an image in an advancing direction of the vehicle; a recognition unit configured to recognize the lateral position of the vehicle in the lane based on the image; an acquisition unit configured to acquire an approaching speed that is a lateral speed at which the vehicle approaches a lane boundary line in a width direction of the lane; a determination unit configured to determine whether to execute the lane keeping control based on the lateral position; a selection unit configured to select an operational mode of the lane keeping control from a plurality of operational modes based on the travel speed of the vehicle if the determination unit determines that the lane keeping control is to be executed; a control unit configured to execute the lane keeping control in the operational mode selected by the selection unit; a steering unit configured to apply a steering force to a steering wheel of the vehicle by being controlled by the control unit; and a brake unit configured to apply a brake force to wheels of the vehicle by being controlled by the control unit. The plurality of operational modes include a first operational mode in which the steering unit is operated such that the direction of the vehicle faces the center of the lane, and in which the brake unit is not operated, and a second operational mode in which the steering unit is operated such that the direction of the vehicle faces the center of the lane, and in which the brake unit is operated such that the speed of the vehicle is reduced if the travel speed is less than a second travel speed threshold value, the selection unit selects the first operational mode, and if the travel speed is the second travel speed threshold value or greater, the selection unit selects the second operational mode.

If the travel speed is less than the second travel speed threshold value, the selection unit of the lane keeping control apparatus selects the first operational mode. If the travel speed is the second travel speed threshold value or greater, the selection unit selects the second operational mode. That is, if the travel speed is somewhat low, the steering of the vehicle is controlled by a steering force applied to the steering wheel in a state where a brake force is not applied to the wheels. If the travel speed is somewhat high, the steering of the vehicle is controlled by a steering force applied to the steering wheel in a state where a brake force is applied to the wheels. As such, the apparatus is capable of further reducing a feeling of insecurity to a driver by reducing the speed of the vehicle when the travel speed is somewhat high, in comparison with that when the vehicle is controlled only by a steering force (that is, a brake force is not applied to the wheels). In addition, the apparatus is capable of further reducing a feeling of inconvenience to the driver by not reducing the speed of the vehicle when the travel speed is somewhat low, in comparison with that when a brake force is applied to the wheels every times.

The second travel speed threshold value may be set to a value smaller by the extent of an increase in the approaching speed. In this case, since a brake force is more likely to be applied to the wheels as the approaching speed is increased, the apparatus is capable of further reducing a feeling of insecurity to a driver, and of further reducing a feeling of inconvenience to the driver.

The brake unit may be capable of independently applying a brake force to the right and left wheels of the vehicle. The plurality of operational modes may include a third operational mode in which the steering unit is not operated, and in which the brake unit is operated such that the direction of the vehicle faces the center of the lane. If the travel speed is the second travel speed threshold value or greater, and the approaching speed is less than a third approaching speed threshold value, the selection unit may select the third operational mode instead of the second operational mode. The third operational mode, in which the direction of the vehicle is controlled by a brake force, provides better vehicle responsiveness in comparison with that when the direction of the vehicle is controlled by a steering force. In contrast, if the third operational mode is active, a feeling of insecurity to a driver is high, and a feeling of inconvenience caused by being operated when unnecessary is high. As a result, the apparatus having the aforementioned configuration is capable of reducing a feeling of insecurity to a driver and of reducing a feeling of inconvenience to the driver while effectively preventing departure of the vehicle front the lane by limiting the operation of the third operational mode to when the travel speed is somewhat high and the approaching speed is somewhat low.

The brake unit may be capable of independently applying a brake force to the right and left wheels of the vehicle. The plurality of operational modes may include a third operational mode in which the steering unit is not operated, and in which the brake unit is operated such that the direction of the vehicle faces the center of the lane. If the travel speed is the second travel speed threshold value or greater, and is less than a third travel speed threshold value, the selection unit may select the third operational mode instead of the second operational mode. As such, the apparatus is capable of further reducing a feeling of insecurity to a driver, and of further reducing a feeling of inconvenience to the driver by changing the operational mode in a stepwise manner in correspondence with the travel speed.

The lane keeping control apparatus may further include a storage unit configured to store a characteristic of the lane boundary line and the second travel speed threshold value while correlating the characteristic of the lane boundary line with the second travel speed threshold value. The recognition unit also may acquire the characteristic of the lane boundary line. The selection unit may acquire the second travel speed threshold value with reference to the storage unit based on the characteristic of the lane boundary line acquired by the recognition unit. In this case, the apparatus is capable of changing the second travel speed threshold value in correspondence with a characteristic of a lane boundary line, for example, a solid line, a broken line, a curbstone, or a wall.

According to still another aspect of the present disclosure, there is provided a lane keeping control apparatus that performs lane keeping control to prevent departure of a vehicle from a lane, the apparatus including: a sensor configured to acquire an image in an advancing direction of the vehicle; a recognition unit configured to recognize the lateral position of the vehicle in the lane based on the image; an acquisition unit configured to acquire an approaching speed that is a lateral speed at which the vehicle approaches a lane boundary line in a width direction of the lane; a determination unit configured to determine whether to execute the lane keeping control based on the lateral position; a selection unit configured to select an operational mode of the lane keeping control from a plurality of operational modes based on the approaching speed if the determination unit determines that the lane keeping control is to be executed; a control unit configured to execute the lane keeping control in the operational mode selected by the selection unit; a steering unit configured to apply a steering force to a steering wheel of the vehicle by being controlled by the control unit; and a brake unit configured to independently apply a brake force to wheels of the vehicle by being controlled by the control unit. The plurality of operational modes include a first operational mode in which the steering unit is operated such that the direction of the vehicle faces the center of the lane, and in which the brake unit is not operated, and a third operational mode in which the steering unit is not operated, and in which the brake unit is operated such that the direction of the vehicle faces the center of the lane. If the approaching speed is less than a fourth approaching speed threshold value, the selection unit selects the first operational mode, and if the approaching speed is the fourth approaching speed threshold value or greater, the selection unit selects the third operational mode.

If the approaching speed is less than the fourth approaching speed threshold value, the selection unit of the lane keeping control apparatus selects the first operational mode. If the approaching speed is the fourth approaching speed threshold value or greater, the selection unit selects the third operational mode. That is, if the approaching speed is somewhat low, the steering of the vehicle is controlled by a steering force applied to the steering wheel in a state where a brake force is not applied to the wheels. If the approaching speed is somewhat high, the steering of the vehicle is controlled by a brake force applied to the wheels such that the vehicle is turned. As such, the apparatus is capable of more quickly changing the direction of the vehicle by turning the vehicle via a difference in brake force between the right and left wheels when the approaching speed is somewhat high, in comparison with that when the vehicle is controlled only by a steering force. As a result, the apparatus is capable of reducing a feeling of insecurity to a driver. In addition, the apparatus is capable of reducing a feeling of inconvenience to the driver by not reducing the speed of the vehicle when the approaching speed is somewhat low, in comparison with that when a brake force is applied to the wheels every times.

The fourth approaching speed threshold value may be set to a value smaller by the extent of an increase in travel speed of the vehicle. In this case, since a brake force is more likely to be applied to the wheels as the travel speed is increased, the apparatus is capable of further reducing a feeling of insecurity to a driver, and of further reducing a feeling of inconvenience to the driver.

The lane keeping control apparatus may further include a storage unit configured to store a characteristic of the lane boundary line and the fourth approaching speed threshold value while correlating the characteristic of the lane boundary line with the fourth approaching speed threshold value. The recognition unit also may acquire the characteristic of the lane boundary line. The selection unit may acquire the fourth approaching speed threshold value with reference to the storage unit based on the characteristic of the lane boundary line acquired by the recognition unit. In this case, the apparatus is capable of changing the fourth approaching speed threshold value in correspondence with a characteristic of a lane boundary line, for example, a solid line, a broken line, a curbstone, or a wall.

According to still another aspect of the present disclosure, there is provided a lane keeping control apparatus that performs lane keeping control to prevent departure of a vehicle from a lane, the apparatus including: a sensor configured to acquire an image in an advancing direction of the vehicle; a recognition unit configured to recognize the lateral position of the vehicle in the lane based on the image; an acquisition unit configured to acquire an approaching speed that is a lateral speed at which the vehicle approaches a lane boundary line in a width direction of the lane; a determination unit configured to determine whether to execute the lane keeping control based on the lateral position; a selection unit configured to select an operational mode of the lane keeping control from a plurality of operational modes based on the travel speed of the vehicle if the determination unit determines that the lane keeping control is to be executed; a control unit configured to execute the lane keeping control in the operational mode selected by the selection unit; a steering unit configured to apply a steering force to a steering wheel of the vehicle by being controlled by the control unit; and a brake unit configured to independently apply a brake force to wheels of the vehicle by being controlled by the control unit. The plurality of operational modes include a first operational mode in which the steering unit is operated such that the direction of the vehicle faces the center of the lane, and in which the brake unit is not operated, and a third operational mode in which the steering unit is not operated, and in which the brake unit is operated such that the direction of the vehicle faces the center of the lane. If the travel speed is less than a fourth travel speed threshold value, the selection unit selects the first operational mode, and if the travel speed is the fourth travel speed threshold value or greater, the selection unit selects the third operational mode.

If the travel speed is less than the fourth travel speed threshold value, the selection unit of the lane keeping control apparatus selects the first operational mode. If the travel speed is the fourth travel speed threshold value or greater, the selection unit selects the third operational mode. That is, if the travel speed is somewhat low, the steering of the vehicle is controlled by a steering force applied to the steering wheel in a state where a brake force is not applied to the wheels. If the travel speed is somewhat high, the steering of the vehicle is controlled by a brake force applied to the wheels such that the vehicle is turned. As such, the apparatus is capable of more quickly changing the direction of the vehicle by turning the vehicle via a difference in brake force between the right and left wheels when the travel speed is somewhat high, in comparison with that when the vehicle is controlled only by a steering force. As a result, the apparatus is capable of reducing a feeling of insecurity to a driver. In addition, the apparatus is capable of reducing a feeling of inconvenience to the driver by not reducing the speed of the vehicle when the travel speed is somewhat low, in comparison with that when a brake force is applied to the wheels every times.

The fourth travel speed threshold value may be set to a value smaller by the extent of an increase in the approaching speed. In this case, since a brake force is more likely to be applied to the wheels as the approaching speed is increased, the apparatus is capable of further reducing a feeling of insecurity to a driver, and of further reducing a feeling of inconvenience to the driver.

The lane keeping control apparatus may further include a storage unit configured to store a characteristic of the lane boundary line and the fourth travel speed threshold value while correlating the characteristic of the lane boundary line with the fourth travel speed threshold value. The recognition unit also may acquire the characteristic of the lane boundary line. The selection unit may acquire the fourth travel speed threshold value with reference to the storage unit based on the characteristic of the lane boundary line acquired by the recognition unit. In this case, the apparatus is capable of changing the fourth travel speed threshold value in correspondence with a characteristic of a lane boundary line, for example, a solid line, a broken line, a curbstone, or a wall.

According to various aspects and embodiments of the present disclosure, there is provided a lane keeping control apparatus which can be operated such that a driver does not feel secure or inconvenient.

BRIEF DESCRIPTION OF THE DRAWINGS

FIGS. 6A and 6B are flowcharts illustrating examples of the operational mode selection step.

FIGS. 8A and 8B are flowcharts illustrating examples of the operational mode selection step.

FIG. 14 is a table in which characteristics of lane boundary lines are correlated with map identification numbers.

FIGS. 15A to 15D show examples of a map that is used in the operational mode selection step.

DETAILED DESCRIPTION

Hereinafter, embodiments of the present disclosure will be described with reference to the accompanying drawings. In the following description, the same reference signs are assigned to the same or equivalent elements, description thereof are omitted.

First Embodiment

Figure 1:
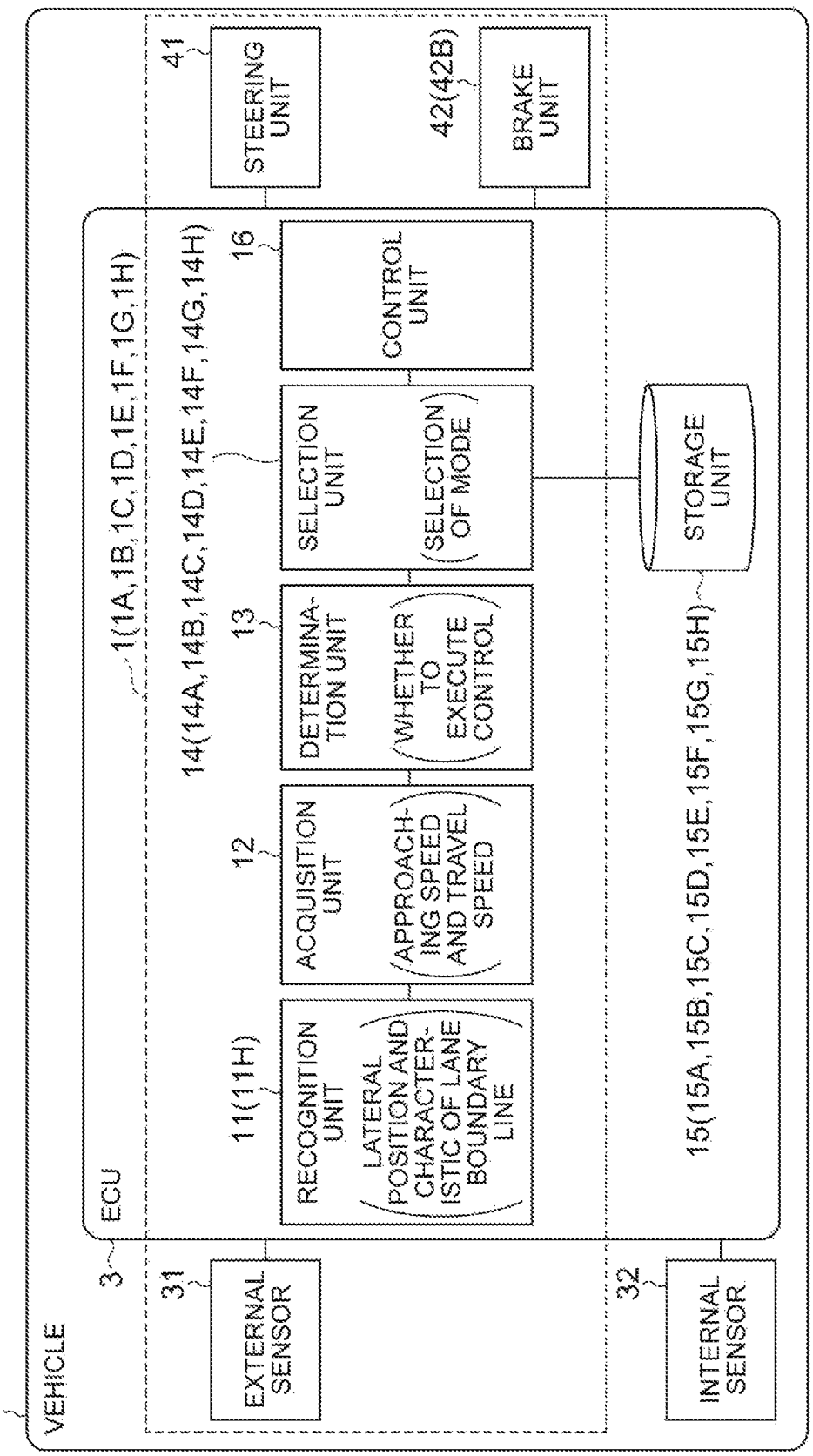
FIG. 1 is a block diagram illustrating the configuration of a vehicle including a lane keeping control apparatus of an embodiment.

FIG. 1 is a block diagram illustrating the configuration of a vehicle 2 including a lane keeping control apparatus 1 of an embodiment. As illustrated in FIG. 1, the lane keeping control apparatus 1 is mounted in the vehicle 2 such as a passer vehicle, and performs lane keeping control to prevent departure of the vehicle 2 from a lane of the vehicle 2. The lane keeping control includes steering control to steer the vehicle 2 such that departure of the vehicle 2 from the lane is prevented, and brake control to brake the vehicle 2 such that departure of the vehicle 2 from the lane is prevented.

The vehicle 2 includes an electronic control unit (ECU) 3; an external sensor 31; an internal sensor 32; a steering unit 41; and a brake unit 42. The ECU 3 is connected to the external sensor 31, the internal sensor 32, the steering unit 41, and the brake unit 42 via a communication network using a controller area network (CAN) communication circuit, and communicates therewith.

The external sensor 31 is a detection device that detects a peripheral situation of the vehicle 2. The external sensor 31 includes a camera (sensor). The camera acquires images in an advancing direction of the vehicle 2. That is, the camera captures images of a situation external to the vehicle 2. For example, the camera is provided on a back side of a front windshield of the vehicle 2. The camera transmits imaging information regarding a situation external, which is a result of detection, to the vehicle 2 to the ECU 3. The imaging information of the camera may contain road environments such as lane boundary lines and information regarding objects. The objects are stationary objects on roads such as walls and fallen objects, or moving objects such as pedestrians and other vehicles. The camera may be a monocular camera or a stereo camera. The stereo camera includes two imaging units which are disposed such that a parallax error between both eyes is reproduced. Imaging information of the stereo camera also contains information in a depth direction.

The internal sensor 32 is a detection device that detects a travel state of the vehicle 2. An example of the internal sensor 32 is a vehicle speed sensor. The vehicle speed sensor is a detector that detects the speed of the vehicle 2. A wheel speed sensor is used as the vehicle speed sensor, and the wheel speed sensor is provided on a wheel of the vehicle 2 or on a drive shaft rotating integrally with a wheel, and detects the rotational speed of the wheel. The vehicle speed sensor transmits information regarding a detected vehicle speed to the ECU 3.

The steering unit 41 is controlled by a control unit 16 (to be described later) of the ECU 3 such that the steering unit 41 applies a steering force (steering torque) to a steering wheel of the vehicle 2. Specifically, the steering unit 41 is a steering actuator. The steering unit 41 controls the driving of an assistance motor of an electric power steering system, which controls a steering torque, in correspondence with control signals from the ECU 3. Accordingly, the steering actuator controls steering torque of the vehicle 2.

The brake unit 42 is controlled by the control unit 16 (to be described later) of the ECU 3 such that the brake unit 42 applies a brake force to the wheels of the vehicle 2. Specifically, the brake unit 42 is a brake actuator. The brake unit 42 controls a brake force applied to the wheels of the vehicle 2 by controlling a brake system in correspondence with control signals from the ECU 3. For example, a hydraulic brake system can be used as the brake system. If the vehicle 2 includes a regenerative brake system, the brake actuator may control both a hydraulic brake system and the regenerative brake system.

The ECU 3 is main hardware of the lane keeping control apparatus 1, and includes a recognition unit 11; an acquisition unit 12; a determination unit 13; a selection unit 14; a storage unit 15; and the control unit 16 as functional elements.

Figure 2:
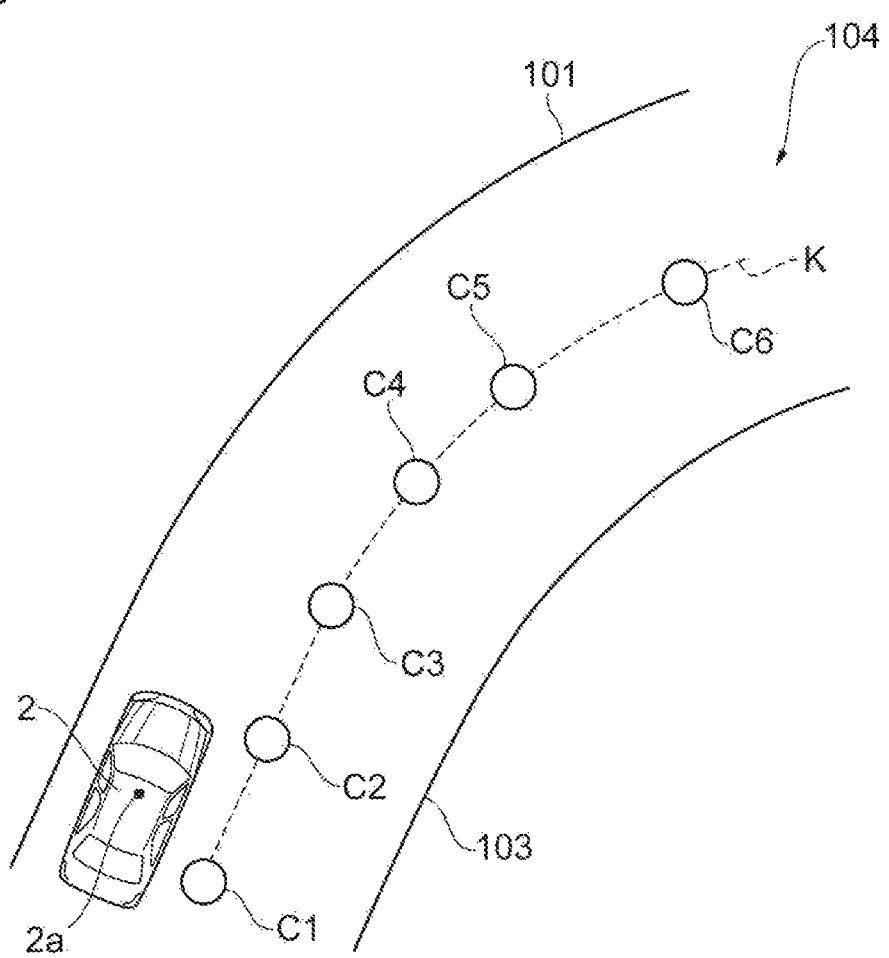
FIG. 2 is a view illustrating an example of the positions of lane boundary lines and the position of the vehicle.

The recognition unit 11 recognizes the lateral position of the vehicle 2 in a lane based on images. The recognition unit 11 uses images acquired by the external sensor 31. The lateral position is the coordinate position of the vehicle 2 in the width of the lane with respect to the center of the lane. The recognition of a lateral position is to acquire a coordinate position. FIG. 2 is a view illustrating an example of the positions of lane boundary lines and the position of the vehicle. As illustrated in FIG. 2, the recognition unit 11 recognizes the positions of lane boundary lines 101 and 103 of a lane 104 in which the vehicle 2 travels, which are positioned on a front side of the vehicle. The front side of the vehicle 2 represents an advancing direction of the vehicle 2. The recognition unit 11 may acquire the coordinate positions of all detection points detected as the lane boundary lines 101 and 103, or may sample representative points of the lane boundary lines 101 and 103.

The recognition unit 11 also recognizes the position of a central line K of the lane, the width of the lane, and the curvature of the lane (shape of the lane) by recognizing the positions of the lane boundary lines 101 and 103. The central line K of the lane is an imaginary line which passes through central points (C1 to C6 in FIG. 2) in a width direction of the lane. The recognition unit 11 may recognize a line of the central points C1 to C6 in the width direction of the lane, which are discretely lined up in the advancing direction of the vehicle 2, as the central line K of the lane. The recognition unit 11 recognizes a centroid position 2a of the vehicle 2 with respect to the central line K of the lane as a lateral position.

The acquisition unit 12 acquires an approaching speed. The approaching speed is a lateral speed at which the vehicle 2 approaches a boundary line of the lane 104 in the width direction of the lane. The approaching speed is calculated with respect to a lane boundary line of the lane boundary lines 101 and 103 which partition off the lane 104, to which the vehicle 2 approaches. The acquisition unit 12 calculates an approaching speed from a change in position of a lane boundary line over time which is acquired by the recognition unit 11.

The determination unit 13 determines whether to execute lane keeping control based on the lateral position. The lane keeping control is vehicle control to prevent departure of the vehicle 2 from the lane, and more specifically, is at least one of steering control and brake control. For example, the determination unit 13 is configured to be capable of referring to the storage unit 15 in which a determination map of the lateral position and the approaching speed is stored in advance. The determination map is a map that determines a range in which a driver can avoid departure of the vehicle even if lane keeping control is not executed. The determination map is an actual measurement result via examinees. The determination unit 13 refers to the determination map based on a lateral position and an approaching speed. If the vehicle is in the range in which the driver can avoid departure of the vehicle even if lane keeping control is not executed, the determination unit 13 determines that the lane keeping control is to be executed. The determination unit 13 refers to the determination map based on a lateral position and an approaching speed. If the vehicle is not in the range in which the driver can avoid departure of the vehicle even if lane keeping control is not executed, the determination unit 13 determines that the lane keeping control is to be executed. The determination unit 13 may determine whether to execute lane keeping control via techniques other than the aforementioned technique. For example, the determination unit 13 may determine whether to execute lane keeping control only based on a lateral position, or may determine whether to execute lane keeping control based on a lateral position and a yaw rate.

If the determination unit 13 determines that lane keeping control is to be executed, the selection unit 14 selects an operational mode of the lane keeping control from a plurality of operational modes based on an approaching speed. The operational modes include a first operational mode and a second operational mode. The first operational mode is an operational mode in which the steering unit 41 is operated such that the direction of the vehicle 2 faces the center of the lane, and in which the brake unit 42 is not operated. That is, the first operational mode is an operational mode in which the advancing direction of the vehicle 2 is controlled only via steering. The second operational mode is an operational mode in which the steering unit 41 is operated such that the direction of the vehicle 2 faces the center of the lane, and in which the brake unit 42 is operated such that the speed of the vehicle 2 is reduced. That is, the second operational mode is an operational mode in which the speed is reduced while the advancing direction of the vehicle 2 is controlled via steering.

If the approaching speed is less than a first approaching speed threshold value, the selection unit 14 selects the first operational mode. If the approaching speed is the first approaching speed threshold value or greater, the selection unit 14 selects the second operational mode. The first approaching speed threshold value is an approaching speed threshold value by which it is determined whether to select the first operational mode or the second operational mode. The first approaching speed threshold value is a value that is determined in advance.

The storage unit 15 is a storage medium that stores the first approaching speed threshold value. The selection unit 14 acquires the first approaching speed threshold value with reference to the storage unit 15.

The control unit 16 executes lane keeping control in an operational mode selected by the selection unit 14. If an operational mode selected by the selection unit 14 is the first operational mode, the control unit 16 operates the steering unit 41 such that the direction of the vehicle 2 faces the center of the lane, and does not operate the brake unit 42. If an operational mode selected by the selection unit 14 is the second operational mode, the control unit 16 operates the steering unit 41 such that the direction of the vehicle 2 faces the center of the lane, and operates the brake unit 42 such that the speed of the vehicle 2 is reduced. When an ending condition of lane keeping control is satisfied, the control unit 16 ends the lane keeping control. The ending condition of the lane keeping control is a case in which the distance from the lateral position of the vehicle 2 to a lane boundary line is a predetermined value or greater.

Figure 3:
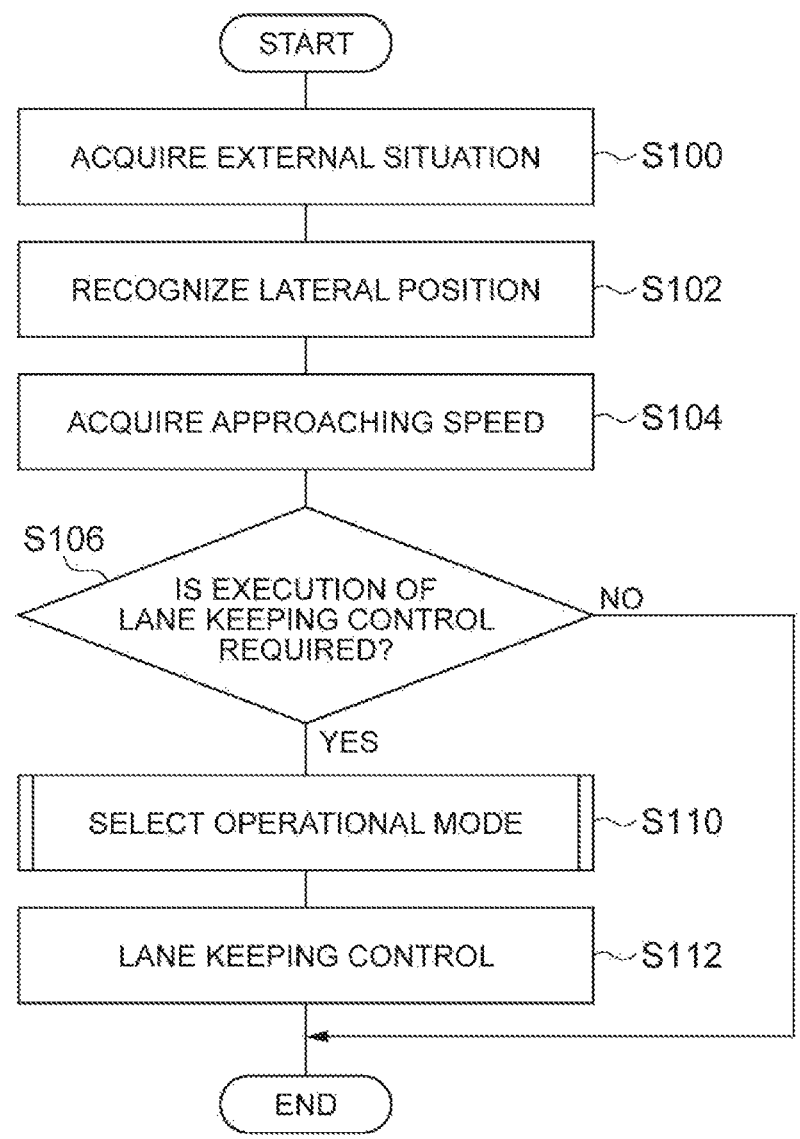
FIG. 3 is a flowchart illustrating an example of a lane keeping control process.

Hereinafter, a lane keeping control process of the lane keeping control apparatus 1 will be described. FIG. 3 is a flowchart illustrating the lane keeping control process of the lane keeping control apparatus 1 illustrated in FIG. 1. The lane keeping control process illustrated in FIG. 3 starts when a signal to start the operation of the lane keeping control apparatus 1 is acquired.

As illustrated in FIG. 3, in an external situation acquisition step (S100), the recognition unit 11 of the lane keeping control apparatus 1 recognizes the positions of the lane boundary lines 101 and 103 of the lane 104 in which the vehicle 2 travels, which are positioned on the front side of the vehicle. Subsequently, in a lateral position recognition step (S102), the recognition unit 11 recognizes the lateral position of the vehicle 2 in the lane 104 in which the vehicle 2 travels. Subsequently, in an approaching speed acquisition step (S104), the acquisition unit 12 of the lane keeping control apparatus 1 acquires the speed of the vehicle 2 approaching a lane boundary line.

Subsequently, in a determination step 106), the determination unit 13 of the lane keeping control apparatus 1 determines whether to execute lane keeping control based on a lateral position and an approaching speed. The determination unit 13 determines whether to execute the lane keeping control with reference to the aforementioned determination map based on the lateral position and the approaching speed.

Figure 4A:
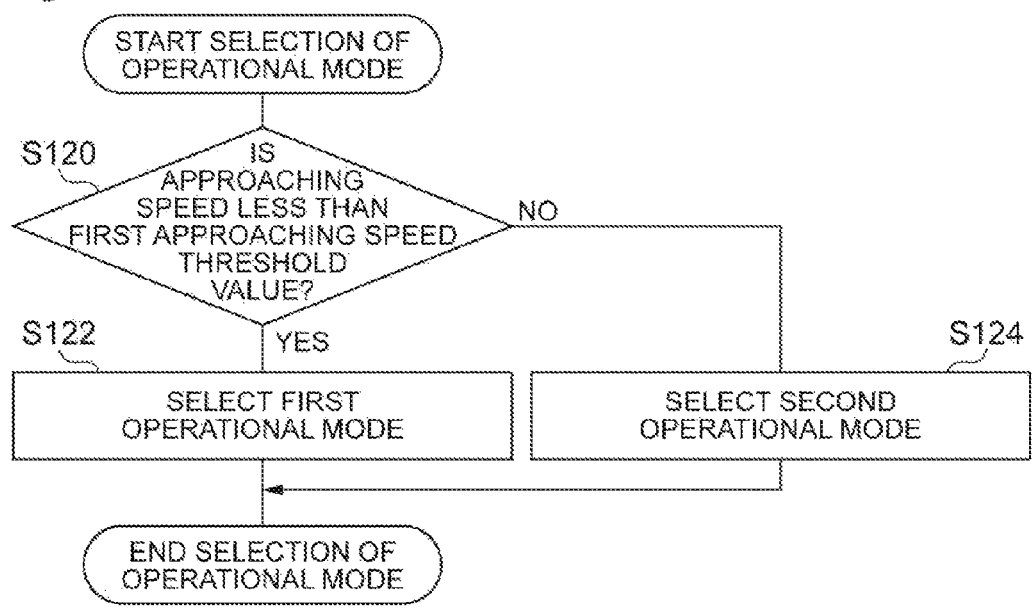
FIGS. 4A and 4B are flowcharts illustrating examples of an operational mode selection step.
Figure 5A:
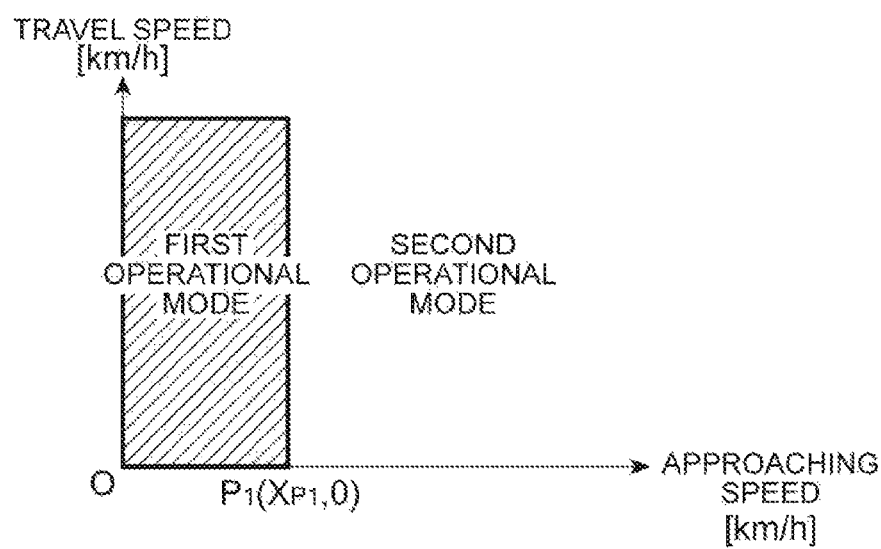
FIGS. 5A to 5C show examples of a map that is used in the operational mode selection step.
Figure 5B:
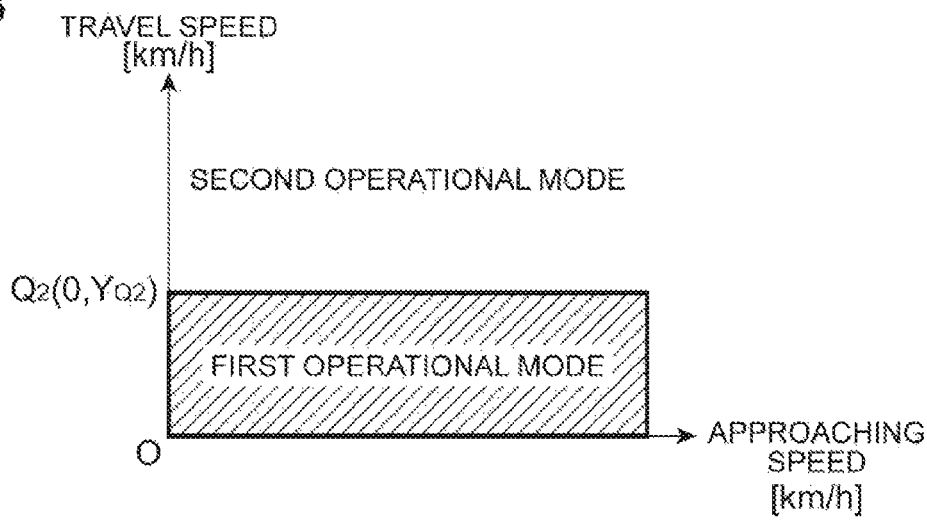
Figure 5C:
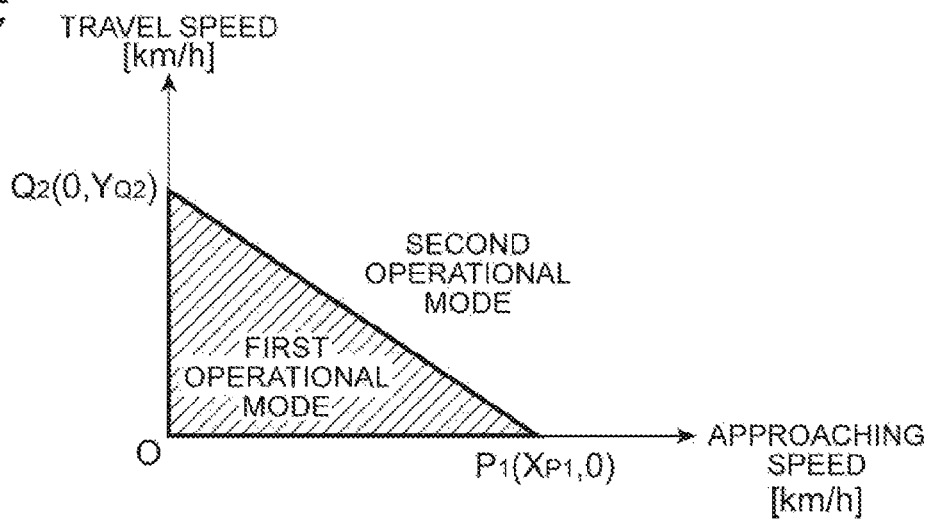

If it is determined in the determination step (S106) that the lane keeping control is to be executed, the selection unit 14 of the lane keeping control apparatus 1 performs an operational mode selection step (S110). FIG. 4A is a flowchart illustrating an example of the operational mode selection step. As illustrated in FIG. 4A, in a determination step (S120), the selection unit 14 determines whether the approaching speed is less than the first approaching speed threshold value. The selection unit 14 acquires the first approaching speed threshold value stored in the storage unit 15, and performs the determination step. FIG. 5A is an example of a map that is used in the operational mode selection step. As illustrated in FIG. 5A, the first approaching speed threshold value is $X_{P1}$. The first approaching speed threshold value $X_{P1}$ may be a variable. For example, as illustrated in FIG. 5C, the first approaching speed threshold value $X_{P1}$ may be set to a value smaller by the extent of an increase in travel speed of the vehicle 2. Specifically, when the travel speed is zero, the first approaching speed threshold value is $X_{P1}$, and when the travel speed is $Y_{Q2}$, the first approaching speed threshold value is zero. That is, the first approaching speed threshold value is an X component of a point on a line $P_1Q_2$. If the approaching speed is less than the first approaching speed threshold value, the selection unit 14 selects the first operational mode in a selection step (S122). If the approaching speed is not less than the first approaching speed threshold value, the selection unit 14 selects the second operational mode in a selection step (S124).

Returning to FIG. 3, in a lane keeping control step (S112), the control unit 16 of the lane keeping control apparatus 1 performs lane keeping control of the vehicle 2 based on an operational mode selected in the operational mode selection step (S110). The control unit 16 performs the lane keeping control until an ending condition of the lane keeping control is satisfied.

If the lane keeping control step (S112) ends, or if it is determined in the determination step (S106) that the lane keeping control is to not be executed, the flowchart illustrated in FIG. 3 ends. If the flowchart ends and a signal to end the operation of the lane keeping control apparatus 1 is not acquired, the process starts from the external situation acquisition step (S100) again. As such, the process of the flowchart illustrated in FIG. 3 is repeatedly executed until a signal to end the operation of the lane keeping control apparatus 1 is acquired.

As described above, if the approaching speed is less than the first approaching speed threshold value $X_{P1}$, the selection unit 14 of the lane keeping control apparatus 1 of the first embodiment selects the first operational mode, and if the approaching speed is the first approaching speed threshold value $X_{P1}$ or greater, the selection unit 14 selects the second operational mode. That is, if the approaching speed is somewhat low, the steering of the vehicle 2 is controlled by a steering force applied to the steering wheel in a state where a brake force is not applied to the wheels. If the approaching speed is somewhat high, the steering of the vehicle 2 is controlled by a steering force applied to the steering wheel in a state where a brake force is applied to the wheels. As such, the apparatus is capable of further reducing a feeling of insecurity to a driver by reducing the speed of the vehicle 2 when the approaching speed is somewhat high, in comparison with that when the vehicle 2 is controlled only by a steering force (that is, a brake force is not applied to the wheels). In addition, the apparatus is capable of further reducing a feeling of inconvenience to the driver by not reducing the speed of the vehicle 2 when the approaching speed is somewhat low, in comparison with that when a brake force is applied to the wheels every times.

In the lane keeping control apparatus 1 of the first embodiment, the first approaching speed threshold value $X_{P1}$ may be set to a value smaller by the extent of an increase in travel speed of the vehicle 2. In this case, since a brake force is more likely to be applied to the wheels as the travel speed is increased, the apparatus is capable of further reducing a feeling of insecurity to a driver, and of further reducing a feeling of inconvenience to the driver.

Second Embodiment

A lane keeping control apparatus 1A of a second embodiment is different from the lane keeping control apparatus 1 of the first embodiment in that the lane keeping control apparatus 1A includes a selection unit 14A having a function different from that of the selection unit 14, and a storage unit 15A storing information different from that stored in the storage unit 15. The rest of the configuration is the same as that in the first embodiment. In the second embodiment, description which is duplicated in the first embodiment will be omitted, and mainly the points of difference will be described.

Initially, the points of difference in configuration will be described. If the determination unit 13 determines that lane keeping control is to be executed, the selection unit 14A selects an operational mode of the lane keeping control from a plurality of operational modes based on a travel speed. The travel speed is the speed of the vehicle 2 which is detected by the external sensor 31. The operational modes include the first operational mode and the second operational mode. If the travel speed is less than a second travel speed threshold value, the selection unit 14A selects the first operational mode if the travel speed is the second travel speed threshold value or greater, the selection unit 14A selects the second operational mode. The second travel speed threshold value is a travel speed threshold value by which it is determined whether to select the first operational mode or the second operational mode. The second travel speed threshold value is a value that is determined in advance. The storage unit 15A is a storage medium that stores the second travel speed threshold value. The selection unit 14A acquires the second travel speed threshold value with reference to the storage unit 15A. Other configuration elements of the lane keeping control apparatus 1A are the same as those of the lane keeping control apparatus 1.

Hereinafter, a lane keeping control process of the lane keeping control apparatus 1A will be described. The operational mode selection step (S110) of the lane keeping control process of the lane keeping control apparatus 1A is different from that of the lane keeping control process of the lane keeping control apparatus 1, and other steps are the same as those of the lane keeping control apparatus 1.

Figure 4B:
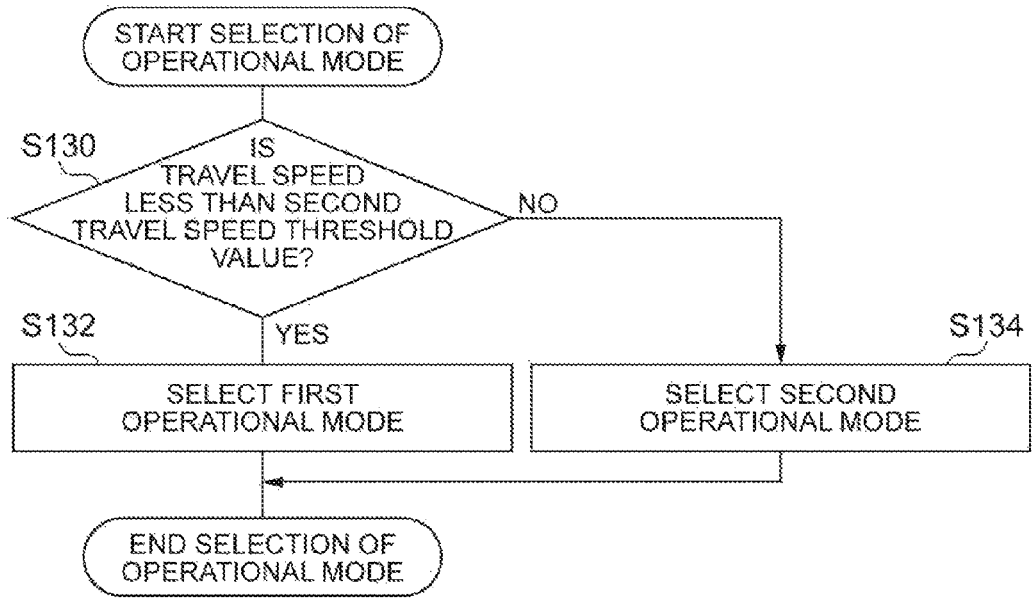

FIG. 4B illustrates the operational mode selection step (S110) of the lane keeping control apparatus 1A. As illustrated in FIG. 4B, in a determination step (S130), the selection unit 14A determines whether the travel speed is less than the second travel speed threshold value. The selection unit 14A acquires the second travel speed threshold value stored in the storage unit 15A, and performs the determination step. FIG. 5B illustrates an example of a map that is used in the operational mode selection step. As illustrated in FIG. 5B, the second travel speed threshold value is $Y_{Q2}$. The second travel speed threshold value $Y_{Q2}$ may be a variable. For example, as illustrated in FIG. 5C, the second travel speed threshold value $Y_{Q2}$ may be set to a value smaller by the extent of an increase in approaching speed of the vehicle 2. Specifically, when the approaching speed is zero, the second travel speed threshold value is $Y_{Q2}$, and when the approaching speed is $X_{P1}$, the second travel speed threshold value is zero. That is, the second travel speed threshold value is a Y component of a point on the line $P_1Q_2$. If the travel speed is less than the second travel speed threshold value, the selection unit 14A selects the first operational mode in a selection step (S132). If the travel speed is not less than the second travel speed threshold value, the selection unit 14A selects the second operational mode in a selection step (S134).

As described above, if the travel speed is less than the second travel speed threshold value $Y_{Q2}$, the selection unit 14A of the lane keeping control apparatus 1A of the second embodiment selects the first operational mode, and if the travel speed is the second travel speed threshold value $Y_{Q2}$ or greater, the selection unit 14A selects the second operational mode. That is, if the travel speed is somewhat low, the steering of the vehicle 2 is controlled, by a steering force applied to the steering wheel in a state where a brake force is not applied to the wheels. If the travel speed is somewhat high, the steering of the vehicle 2 is controlled by a steering force applied to the steering wheel in a state where a brake force is applied to the wheels. As such, the apparatus is capable of further reducing a feeling of insecurity to a driver by reducing the speed of the vehicle 2 when the travel speed is somewhat high, in comparison with that when the vehicle 2 is controlled only by a steering force (that is, a brake force is not applied to the wheels). In addition, the apparatus is capable of further reducing a feeling of inconvenience to the driver by not reducing the speed of the vehicle 2 when the travel speed is somewhat low, in comparison with that when a brake force is applied to the wheels every times.

In the lane keeping control apparatus 1A of the second embodiment, the second travel speed threshold value $Y_{Q2}$ may be set to a value smaller by the extent of an increase in approaching speed of the vehicle 2. In this case, since a brake force is more likely to be applied to the wheels as the approaching speed is increased, the apparatus is capable of further reducing a feeling of insecurity to a driver, and of further reducing a feeling of inconvenience to the driver.

Third Embodiment

A lane keeping control apparatus 1B of a third embodiment is different from the lane keeping control apparatus 1 of the first embodiment in that the lane keeping control apparatus 1B includes a selection unit 14B having a function different from that of the selection unit 14, a storage unit 15B storing information different from that stored in the storage unit 15, and a brake unit 42B having a function different from that of the brake unit 42. The rest of the configuration is the same as that in the first embodiment. In the third embodiment, description which is duplicated in the first embodiment will be omitted, and mainly the points of difference will be described.

Initially, the points of difference in configuration will be described. The brake unit 42B is capable of independently applying a brake force to the right and left wheels of the vehicle 2 in addition to having the function of the brake unit 42. The brake unit 42B generates a yaw moment via a difference in brake force between the right and left wheels in a direction in which departure of the vehicle is avoided. It is possible to adopt well-known techniques in a method of determining a brake force and a method of controlling a brake force.

The selection unit 14B is capable of selecting not only the first and second operational modes but also a third operational mode in comparison with those selectable by the selection unit 14. The third operational mode is an operational mode in which the steering unit 41 is not operated, and in which the brake unit 42B is operated such that the direction of the vehicle 2 faces the center of the lane. That is, in the third operational mode, the vehicle 2 is turned due to a difference in brake force between the right and left wheels.

If the determination unit 13 determines that lane keeping control is to be executed, the selection unit 14B selects an operational mode of the lane keeping control from a plurality of operational modes based on an approaching speed. The selection unit 14B determines either one of the first operational mode and the second operational mode via the same technique as that of the selection unit 14, based on the first approaching speed threshold value $X_{P1}$. If the approaching speed is the first approaching speed threshold value $X_{P1}$ or greater, and is less than a second approaching speed threshold value, the selection unit 14B selects the third operational mode instead of the second operational mode. The second approaching speed threshold value is an approaching speed threshold value by which it is determined whether to select the second operational mode or the third operational mode. The second approaching speed threshold value is a value that is determined in advance. As such, if the vehicle 2 approaches a lane boundary line at a somewhat approaching speed, the lane keeping control apparatus 1B turns the vehicle 2 via a difference in brake force between the right and left wheels. Other configuration elements of the lane keeping control apparatus 1B are the same as those of the lane keeping control apparatus 1.

Hereinafter, a lane keeping control process of the lane keeping control apparatus 1B will be described. The operational mode selection step (S110) of the lane keeping control process of the lane keeping control apparatus 1B is different from that of the lane keeping control process of the lane keeping control apparatus 1, and other steps are the same as those of the lane keeping control apparatus 1.

Figure 7A:
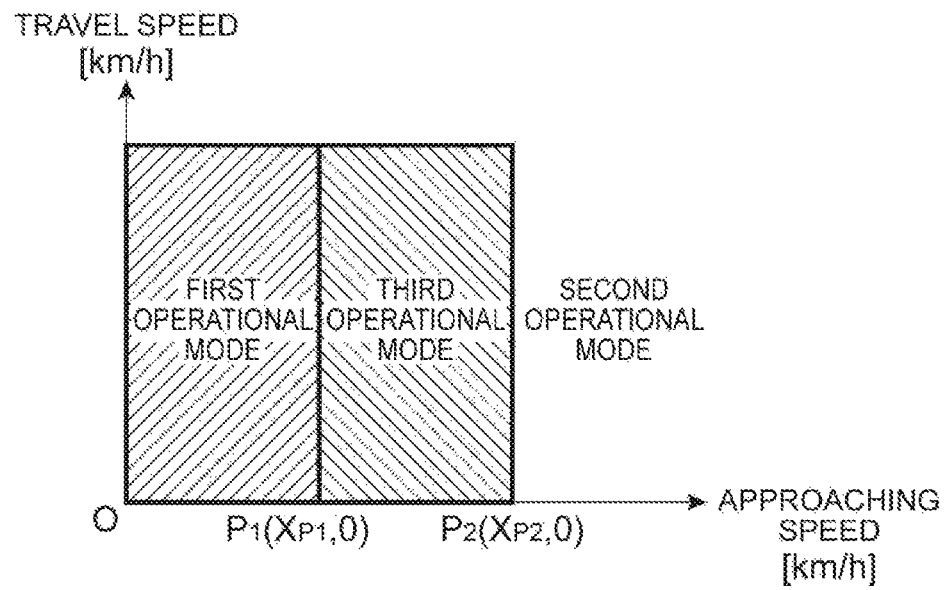
FIGS. 7A and 7B show examples of a map that is used in the operational mode selection step.

FIGS. 6A and 6B are flowcharts illustrating an example of the operational mode selection step. FIG. 6A illustrates the operational mode selection step (S110) of the lane keeping control apparatus 1B. As illustrated in FIG. 6A, in a determination step (S140), the selection unit 14B determines whether the approaching speed is less than the first approaching speed threshold value. The selection unit 14B acquires the first approaching speed threshold value stored in the storage unit 15B, and performs the determination step. FIG. 7A illustrates an example of a map that is used in the operational mode selection step. As illustrated in FIG. 7A, the first approaching speed threshold value is $X_{P1}$. If the approaching speed is less than the first approaching speed threshold value $X_{P1}$, the selection unit 14B selects the first operational mode in a selection step (S142). If the approaching speed is not less than the first approaching speed threshold value $X_{P1}$, in a determination step (S144), the selection unit 14B determines whether the approaching speed is less than the second approaching speed threshold value. The selection unit 14B acquires the second approaching speed threshold value stored in the storage unit 15B, and performs the determination step. As illustrated in FIG. 7A, the second approaching speed threshold value is $X_{P2}$. If the approaching speed is less than the second approaching speed threshold value $X_{P2}$, the selection unit 14B selects the third operational mode in a selection step (S146). If the approaching speed is not less than the second approaching speed threshold value $X_{P2}$, the selection unit 14B selects the second operational mode in a selection step (S148).

As described above, the selection unit 14B of the lane keeping control apparatus 1B of the third embodiment changes the operational mode in a stepwise manner in correspondence with the approaching speed. For this reason, the apparatus is capable of farther reducing a feeling of insecurity to a driver, and of further reducing a feeling of inconvenience to the driver while providing the same effects as those of the lane keeping control apparatus 1.

Fourth Embodiment

A lane keeping control apparatus 1C of a fourth embodiment is different from the lane keeping control apparatus 1A of the second embodiment in that the lane keeping control apparatus 1C includes a selection unit 14C having a function different from that of the selection unit 14A, a storage unit 15C storing information different from that stored in the storage unit 15A, and the brake unit 42B having a function different from that of the brake unit 42. The rest of the configuration is the same as that in the second embodiment. In the fourth embodiment, description which is duplicated in the second embodiment will be omitted, and mainly the points of difference will be described.

Initially, the points of difference in configuration will be described. The brake unit 42B is capable of independently applying a brake force to the right and left wheels of the vehicle 2 in addition to having the function of the brake unit 42. The brake unit 42B generates a yaw moment via a difference in brake force between the right and left wheels in a direction in which departure of the vehicle is avoided. It is possible to adopt well-known techniques in a method of determining a brake force and a method of controlling a brake force.

The selection unit 14C is capable of selecting not only the first and second operational modes but also the third operational mode in comparison with those selectable by the selection unit 14A. The third operational mode is an operational mode in which the steering unit 41 is not operated, and in which the brake unit 42B is operated such that the direction of the vehicle 2 faces the center of the lane. That is, in the third operational mode, the vehicle 2 is turned due to a difference in brake force between the right and left wheels.

If the determination unit 13 determines that lane keeping control is to be executed, the selection unit 14C selects an operational mode of the lane keeping control from a plurality of operational modes based on a travel speed. The selection unit 14C determines either one of the first operational mode and the second operational mode via the same technique as that of the selection unit 14A, based on the second travel speed threshold value $Y_{Q2}$. If the travel speed is the second travel speed threshold value $Y_{Q2}$ or greater, and is less than a third travel speed threshold value, the selection unit 14C selects the third operational mode instead of the second operational mode. The third travel speed threshold value is a travel speed threshold value by which it is determined whether to select the second operational mode or the third operational mode. The third travel speed threshold value is a value that is determined in advance. As such, if the vehicle 2 travels at a somewhat travel speed, the lane keeping control apparatus 1C turns the vehicle 2 via a difference in brake force between the right and left wheels. Other configuration elements of the lane keeping control apparatus 1C are the same as those of the lane keeping control apparatus 1A.

Hereinafter, a lane keeping control process of the lane keeping control apparatus 1C will be described. The operational mode selection step (S110) of the lane keeping control process of the lane keeping control apparatus 1C is different from that of the lane keeping control process of the lane keeping control apparatus 1A, and other steps are the same as those of the lane keeping control apparatus 1A.

Figure 7B:
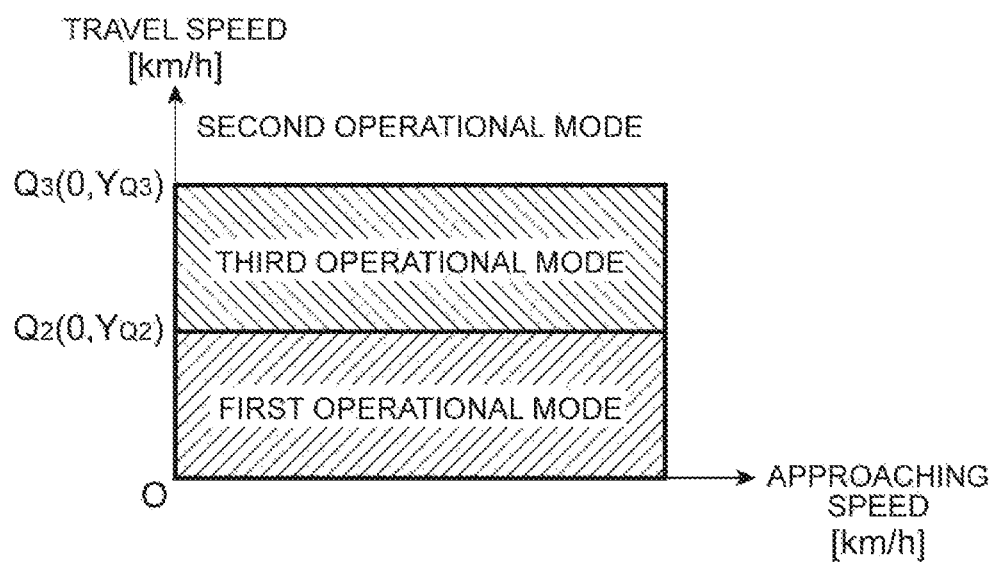

FIGS. 6A and 6B are flowcharts illustrating an example of the operational mode selection step. FIG. 6B illustrates the operational mode selection step (S110) of the lane keeping control apparatus 1C. As illustrated in FIG. 6B, in a determination step (S150), the selection unit 14C determines whether the travel speed is less than the second travel speed threshold value. The selection unit 14C acquires the second travel speed threshold value stored in the storage unit 15C, and performs the determination step. FIG. 7B illustrates an example of a map that is used in the operational mode selection step. As illustrated in FIG. 7B, the second travel speed threshold value is $Y_{Q2}$. If the travel speed is less than the second travel speed threshold value $Y_{Q2}$, the selection unit 14C selects the first operational mode in a selection step (S152). If the travel speed is not less than the second travel speed threshold value $Y_{Q2}$, in a determination step (S154), the selection unit 14C determines whether the travel speed is less than the third travel speed threshold value. The selection unit 14C acquires the third travel speed threshold value stored in the storage unit 15C, and performs the determination step. As illustrated in FIG. 7B, the third travel speed threshold value is $Y_{Q3}$. If the travel speed is less than the third travel speed threshold value $Y_{Q3}$, the selection unit 14C selects the third operational mode in a selection step (S156). If the travel speed is not less than the third travel speed threshold value $Y_{Q3}$, the selection unit. 14C selects the second operational mode in a selection step (S158).

As described above, the selection unit 14C of the lane keeping control apparatus 1C of the fourth embodiment changes the operational mode in a stepwise manner in correspondence with the travel speed. For this reason, the apparatus is capable of further reducing a feeling of insecurity to a driver, and of further reducing a feeling of inconvenience to the driver while providing the same effects as those of the lane keeping control apparatus 1A.

Fifth Embodiment

A lane keeping control apparatus 1D of a fifth embodiment is different from the lane keeping control apparatus 1B of the third embodiment in that the lane keeping control apparatus 1D includes a selection unit 14D having a function different from that of the selection unit 14B and a storage unit 15D storing information different from that stored in the storage unit 15B. The rest of the configuration is the same as that in the third embodiment. In the fifth embodiment, description which is duplicated in the third embodiment will be omitted, and mainly the points of difference will be described.

If the determination unit 13 determines that lane keeping control is to be executed, the selection unit 14D selects an operational mode of the lane keeping control from a plurality of operational modes based on an approaching speed. The selection unit 14D determines either one of the first operational mode and the second operational mode via the same technique as that of the selection unit 14B, based on the first approaching speed threshold value. If the approaching speed is the first approaching speed threshold value or greater, and the travel speed of the vehicle 2 is less than the first travel speed threshold value, the selection unit 14D selects the third operational mode instead of the second operational mode. The first travel speed threshold value is a travel speed threshold value by which it is determined whether to select the second operational mode or the third operational mode. The first travel speed threshold value is a value that is determined in advance. As such, if the vehicle 2 approaches a lane boundary line at a somewhat approaching speed, and the travel speed is not relatively high, the lane keeping control apparatus 1D turns the vehicle 2 via a difference in brake force between the right and left wheels. Other configuration elements of the lane keeping control apparatus 1D are the same as those of the lane keeping control apparatus 1B.

Hereinafter, a lane keeping control process of the lane keeping control apparatus 1D will be described. The operational mode selection step (S110) of the lane keeping control process of the lane keeping control apparatus 1D is different from that of the lane keeping control process of the lane keeping control apparatus 1B, and other steps are the same as those of the lane keeping control apparatus 1B.

Figure 9A:
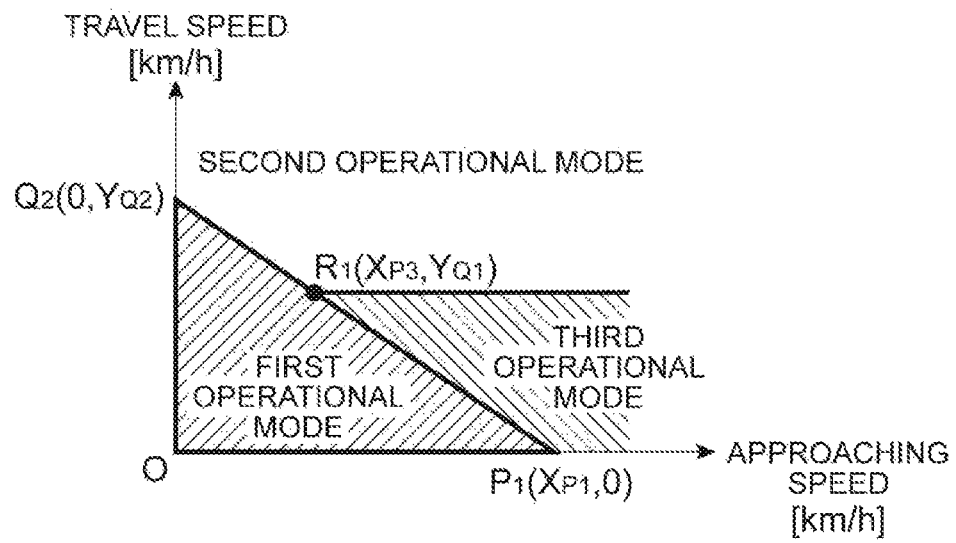
FIGS. 9A and 9B show examples of a map that is used in the operational mode selection step.
Figure 9B:
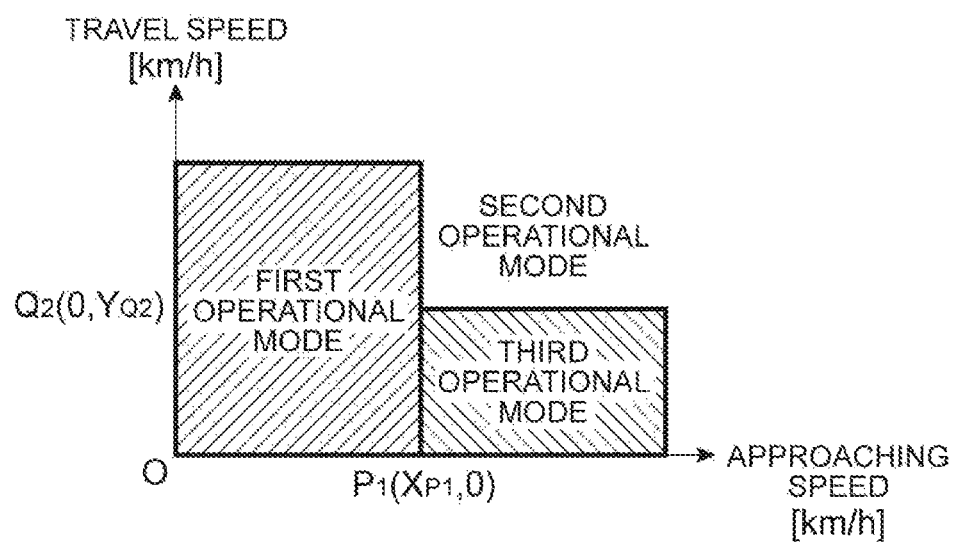

FIGS. 8A and 8B are flowcharts illustrating an example of the operational mode selection step. FIG. 8A illustrates the operational mode selection step (S110) of the lane keeping control apparatus 1D. As illustrated in FIG. 8A, in a determination step (S160), the selection unit 14D determines whether the approaching speed is less than the first approaching speed threshold value. The selection unit 14D acquires the first approaching speed threshold value stored in the storage unit 15D, and performs the determination step. FIG. 9A illustrates an example of a map that is used in the operational mode selection step. As illustrated in FIG. 9A, the first approaching speed threshold value is a variable, and is a value smaller by the extent of an increase in travel speed of the vehicle 2. For example, when the travel speed is zero, the first approaching speed threshold value is $X_{P1}$, and when the travel speed is $Y_{Q2}$, the first approaching speed threshold value is zero. That is, the first approaching speed threshold value is an X component of a point on the line $P_1Q_2$. If the approaching speed is less than the first approaching speed threshold value, the selection unit 14D selects the first operational mode in a selection step (S162). If the approaching speed is not less than the first approaching speed threshold value, in a determination step (S164), the selection unit 14D determines whether the travel speed is less than the first travel speed threshold value. The selection unit 14D acquires the first travel speed threshold value stored in the storage unit 15B, and performs the determination step. As illustrated in FIG. 9A, the first travel speed threshold value is $Y_{Q1}$. If the travel speed is less than the first travel speed threshold value $Y_{Q1}$, the selection unit 14D selects the third operational mode in a selection step (S166). If the travel speed is not less than the first travel speed threshold value $Y_{Q1}$, the selection unit 14D selects the second operational mode in a selection step (S168). As illustrated in FIG. 9B, the first approaching speed threshold value may be a constant.

The lane keeping control apparatus 1D of the fifth embodiment limits the operation of the third operational mode to when the travel speed is somewhat low, and the approaching speed is somewhat high. The third operational mode, in which the direction of the vehicle 2 is controlled by a brake force, provides better vehicle responsiveness in comparison with that when the direction of the vehicle is controlled by a steering force. In contrast, if the third operational mode is active, a feeling of insecurity to a driver is high, and a feeling of inconvenience caused by being operated when unnecessary is high. For this reason, the lane keeping control apparatus 1D is capable of reducing a feeling of insecurity to a driver and to reduce a feeling of inconvenience to the driver while effectively preventing departure of the vehicle from the lane by limiting the operation of the third operational mode as described.

Sixth Embodiment

A lane keeping control apparatus 1E of a sixth embodiment is different from the lane keeping control apparatus 1C of the fourth embodiment in that the lane keeping control apparatus 1E includes a selection unit 14E having a function different from that of the selection unit 14C, and a storage unit 15E storing information different from that stored in the storage unit 15C. The rest of the configuration is the same as that in the fourth embodiment. In the sixth embodiment, description which is duplicated in the fourth embodiment will be omitted, and mainly the points of difference will be described.

If the determination unit 13 determines that lane keeping control is to be executed, the selection unit 14E selects an operational mode of the lane keeping control from a plurality of operational modes based on an approaching speed. The selection unit 14E determines either one of the first operational mode and the second operational mode via the same technique as that of the selection unit 14C, based on the second travel speed threshold value $Y_{Q2}$. If the travel speed is the second travel speed threshold value $Y_{Q2}$ or greater, and the approaching speed of the vehicle 2 is less than a third approaching speed threshold value, the selection unit 14E selects the third operational mode instead of the second operational mode. The third approaching speed threshold value is an approaching speed threshold value by which it is determined whether to select the second operational mode or the third operational mode. The third approaching speed threshold value is a value that is determined in advance. As such, if the vehicle 2 travels at a somewhat travel speed, and the approaching speed is not relatively high, the lane keeping control apparatus 1E turns the vehicle 2 via a difference in brake force between the right and left wheels. Other configuration elements of the lane keeping control apparatus 1 E are the same as those of the lane keeping control apparatus 1C.

Hereinafter, a lane keeping control process of the lane keeping control apparatus 1E will be described. The operational mode selection step (S110) of the lane keeping control process of the lane keeping control apparatus 1E is different from that of the lane keeping control process of the lane keeping control apparatus 1C, and other steps are the same as those of the lane keeping control apparatus 1C.

Figure 10A:
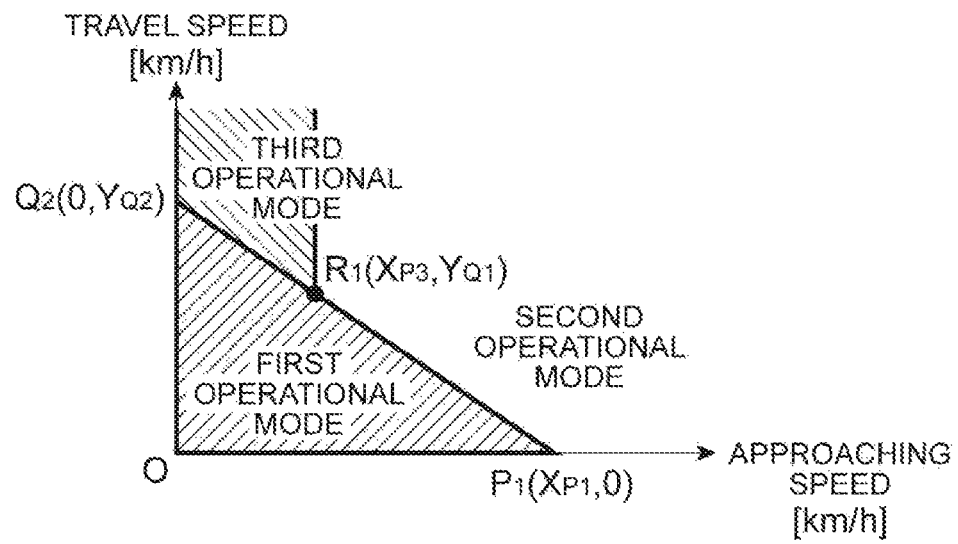
FIGS. 10A and 10B show examples of a map that is used in the operational mode selection step.
Figure 10B:
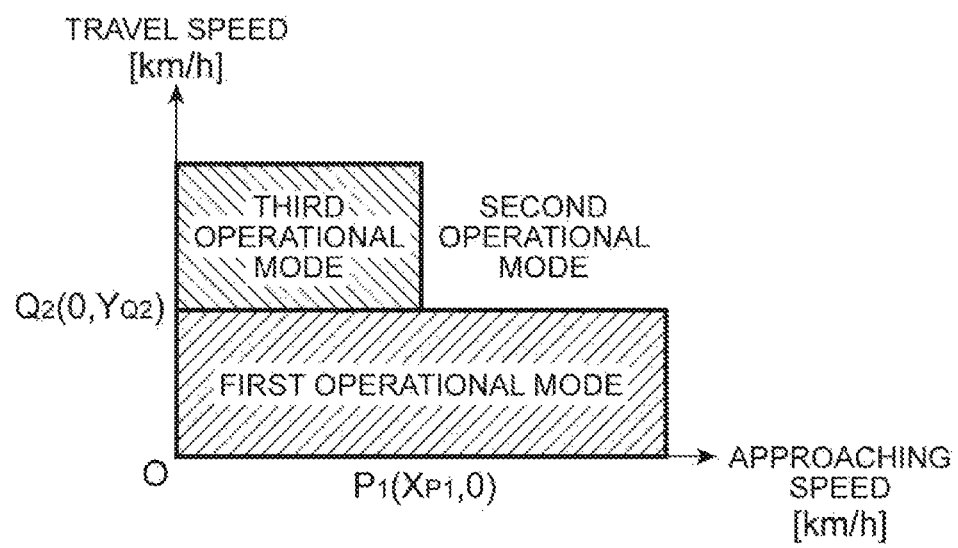

FIG. 8B illustrates the operational mode selection step (S110) of the lane keeping control apparatus 1E. As illustrated in FIG. 8B, in a determination step (S170), the selection unit 14E determines whether the travel speed is less than the second travel speed threshold value. The selection unit 14E acquires the second travel speed threshold value stored in the storage unit 15E, and performs the determination step. As illustrated in FIG. 10A, the second travel speed threshold value is a variable, and is a value smaller by the extent of an increase in approaching speed of the vehicle 2. For example, when the approaching speed is zero, the second travel speed threshold value is $Y_{Q2}$, and when the approaching speed is $X_{P1}$, the second travel speed threshold value is zero. That is, the second travel speed threshold value is a Y component of a point on the line $P_1Q_2$. If the travel speed is less than the second travel speed threshold value, the selection unit 14E selects the first operational mode in a selection step (S172). If the travel speed is not less than the second travel speed threshold value, in a determination step (S174), the selection unit 14E determines whether the approaching speed is less than the third approaching speed threshold value. The selection unit 14E acquires the third approaching speed threshold value stored in the storage unit 15E, and performs the determination step. As illustrated in FIG. 10A, the third approaching speed threshold value is $X_{P3}$. If the approaching speed is less than the third approaching speed threshold value $X_{P3}$, the selection unit 14E selects the third operational mode in a selection step (S176). If the approaching speed is not less than the third approaching speed threshold value $X_{P3}$, the selection unit 14E selects the second operational mode in a selection step (S178). As illustrated in FIG. 10B, the second travel speed threshold value may be a constant.

As described above, the lane keeping control apparatus 1E of the sixth embodiment is capable of reducing a feeling of insecurity to a driver and of reducing a feeling of inconvenience to the driver while effectively preventing departure of the vehicle from the lane by limiting the operation of the third operational mode to when the travel speed is somewhat high, and the approaching speed is somewhat low.

Seventh Embodiment

A lane keeping control apparatus 1F of a seventh embodiment is different from the lane keeping control apparatus 1 of the first embodiment in that the lane keeping control apparatus 1F includes a selection unit 14F having a function different from that of the selection unit 14, a storage unit 15F storing information different from that stored in the storage unit 15, and the brake unit 42B having a function different from that of the brake unit 42. The rest of the configuration is the same as that in the first embodiment. In the seventh embodiment, description which is duplicated in the first embodiment will be omitted, and mainly the points of difference will be described.

Initially, the points of difference in configuration will be described. The brake unit 42B is capable of independently applying a brake force to the right and left wheels of the vehicle 2 in addition to having the function of the brake unit 42. The brake unit 42B generates a yaw moment via a difference in brake force between the right and left wheels in a direction M which departure of the vehicle is avoided. It is possible to adopt well-known techniques in a method of determining a brake force and a method of controlling a brake force.

The selection unit 14F is different from the selection unit 14 in that an operational mode is selected from the first operational mode and the third operational mode. The rest of the functions is the same as that of the selection unit 14. If the approaching speed is less than a fourth approaching speed threshold value, the selection unit 14F selects the first operational mode if the approaching speed is the fourth approaching speed threshold value or greater, the selection unit 14F selects the third operational mode. The fourth approaching speed threshold value is an approaching speed threshold value by which it is determined whether to select the first operational mode or the third operational mode. The fourth approaching speed threshold value is a value that is determined in advance. Other configuration elements of the lane keeping control apparatus 1F are the same as those of the lane keeping control apparatus 1.

Hereinafter, a lane keeping control process of the lane keeping control apparatus 1F will be described. The operational mode selection step (S110) of the lane keeping control process of the lane keeping control apparatus 1F is different from that of the lane keeping control process of the lane keeping control apparatus 1, and other steps are the same as those of the lane keeping control apparatus 1.

Figure 11A:
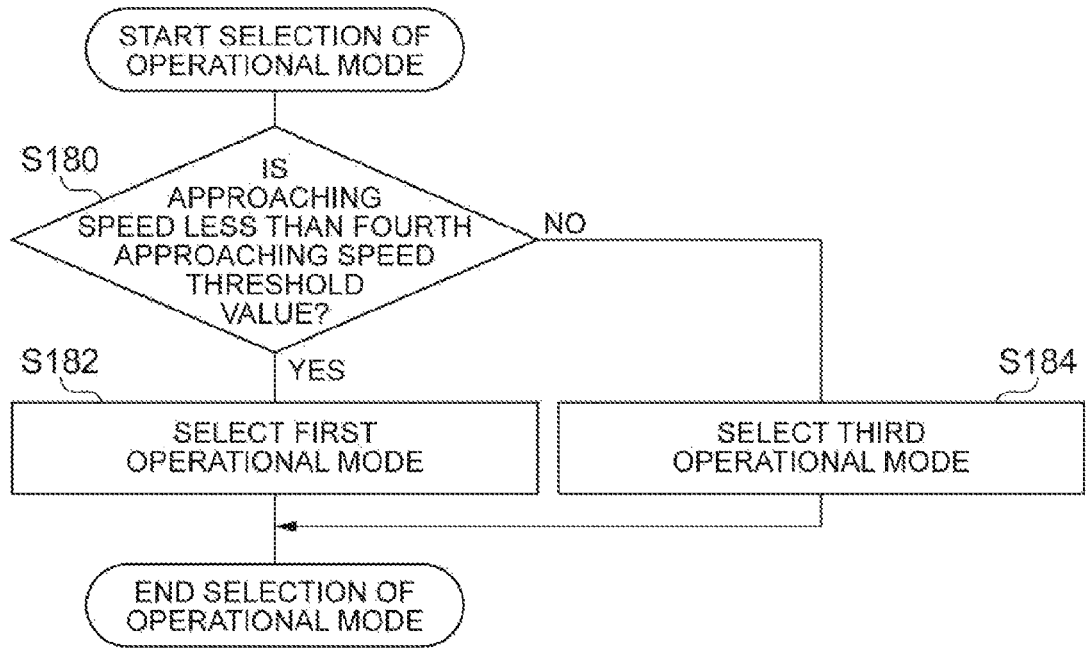
FIGS. 11A and 11B are flowcharts illustrating examples of the operational mode selection step.
Figure 11B:
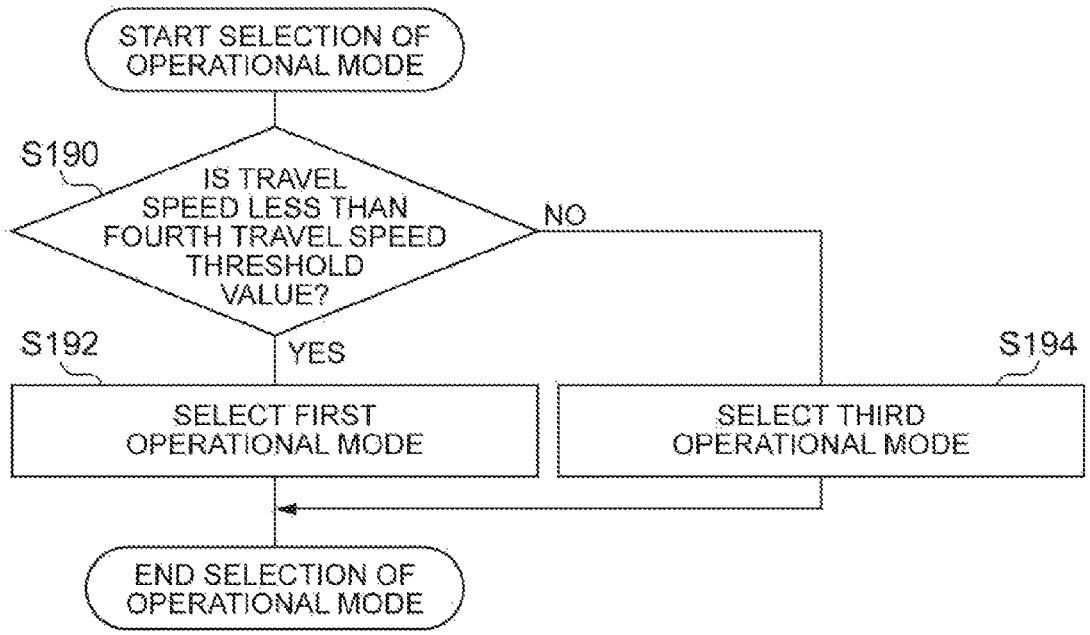
Figure 12A:
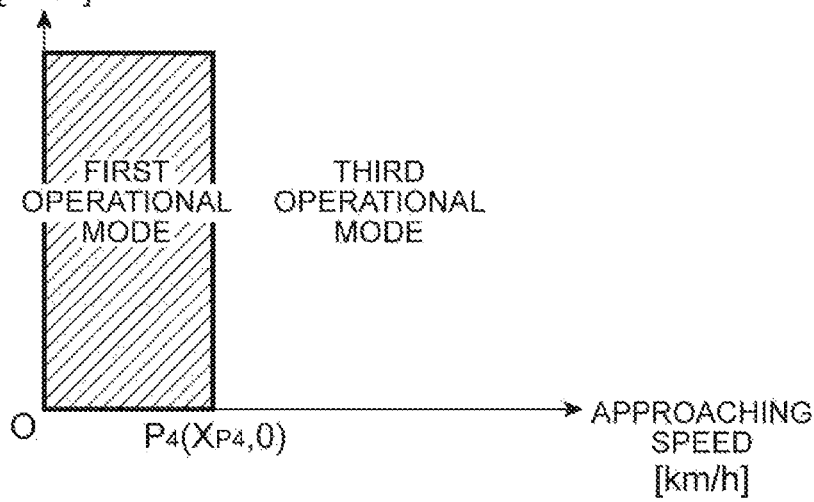
FIGS. 12A to 12C show examples of a map that is used in the operational mode selection step.
Figure 12B:
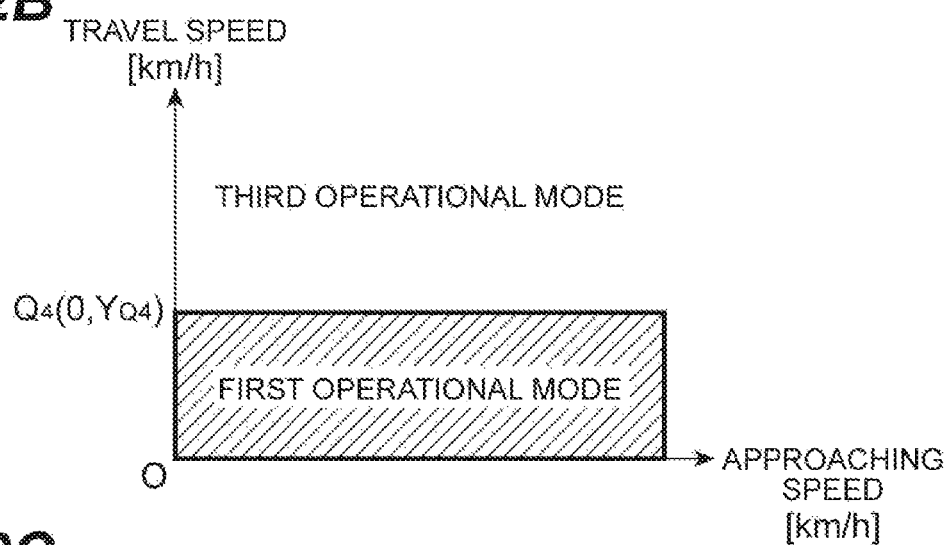
Figure 12C:
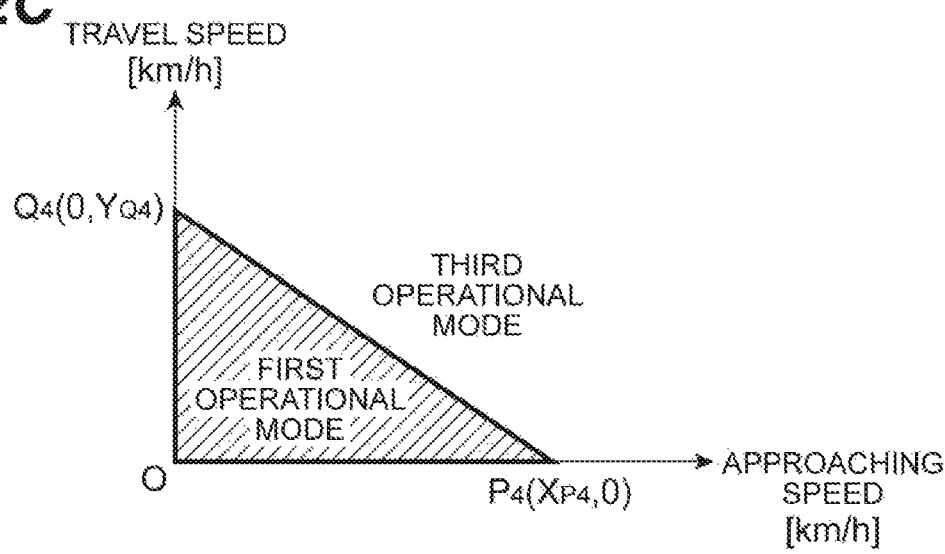

FIGS. 11A and 11B are flowcharts illustrating an example of the operational mode selection step. FIG. 11A illustrates the operational mode selection step (S110) of the lane keeping control apparatus 1F. As illustrated in FIG. 11A, in a determination step (S180), the selection unit 14F determines whether the approaching speed is less than the fourth approaching speed threshold value. The selection unit 14F acquires the fourth approaching speed threshold value stored in the storage unit 15F, and performs the determination step. FIG. 12A illustrates an example of a map that is used in the operational mode selection step. As illustrated in FIG. 12A, the fourth approaching speed threshold value is $X_{P4}$. The fourth approaching speed threshold value $X_{P4}$ may be a variable. For example, as illustrated in FIG. 12C, the fourth approaching speed threshold value $X_{P4}$ may be set to a value smaller by the extent of an increase in travel speed of the vehicle 2. For example, when the travel speed is zero, the fourth approaching speed threshold value is $X_{P4}$, and when the travel speed is $Y_{Q4}$, the fourth approaching speed threshold value is zero. That is, the fourth approaching speed threshold value is an X component of a point on a line $P_4Q_4$. If the approaching speed is less than the fourth approaching speed threshold value $X_{P4}$, the selection unit 14F selects the first operational mode in a selection step (S182). If the approaching speed is not less than the fourth approaching speed threshold value $X_{P4}$, the selection unit 14F selects the third operational mode in a selection step (S184).

As described above, if the approaching speed is less than the fourth approaching speed threshold value $X_{P4}$, the selection unit 14F of the lane keeping control apparatus 1F of the seventh embodiment selects the first operational mode, and if the approaching speed is the fourth approaching speed threshold value $X_{P4}$ or greater, the selection unit 14F selects the third operational mode. That is, if the approaching speed is somewhat low, the steering of the vehicle 2 is controlled by a steering force applied to the steering wheel in a state where a brake force is not applied to the wheels. If the approaching speed is somewhat high, the steering of the vehicle 2 is controlled by a brake force applied to the wheels such that the vehicle 2 is turned. As such, the apparatus is capable of more quickly changing the direction of the vehicle by turning the vehicle via a difference in brake force between the right and left wheels when the approaching speed is somewhat high, in comparison with that when the vehicle 2 is controlled only by a steering force. As a result, the apparatus is capable of reducing a feeling of insecurity to a driver. In addition, the apparatus is capable of reducing a feeling of inconvenience to the driver by not reducing the speed of the vehicle 2 when the approaching speed is somewhat low, in comparison with that when a brake force is applied to the wheels every times.

In the lane keeping control apparatus 1F of the seventh embodiment, the fourth approaching speed threshold value $X_{P4}$ may be set to a value smaller by the extent of an increase in travel speed of the vehicle 2. In this case, since a brake force is more likely to be applied to the wheels as the travel speed is increased, the apparatus is capable of further reducing a feeling of insecurity to a driver, and of further reducing a feeling of inconvenience to the driver.

Eighth Embodiment

A lane keeping control apparatus 1G of an eighth embodiment is different from the lane keeping control apparatus 1A of the second embodiment in that the lane keeping control apparatus 1G includes a selection unit 14G having a function different from that of the selection unit 14A, a storage unit 15G storing information different from that stored in the storage unit 15A, and the brake unit 42B having a function different from that of the brake unit 42. The rest of the configuration is the same as that in the second embodiment. In the eighth embodiment, description which is duplicated in the second embodiment will be omitted, and mainly the points of difference will be described.

Initially, the points of difference in configuration will be described. The brake unit 42B is capable of independently applying a brake force to the right and left wheels of the vehicle 2 in addition to having the function of the brake unit 42. The brake unit 42B generates a yaw moment via a difference in brake force between the right and left wheels in a direction in which departure of the vehicle is avoided. It is possible to adopt well-known techniques in a method of determining a brake force and a method of controlling a brake force.

The selection unit 14G is different from the selection unit 14A in that an operational mode is selected from the first operational mode and the third operational mode. The rest of the functions is the same as that of the selection unit 14A. If the travel speed is less than a fourth travel speed threshold value, the selection unit 14G selects the first operational mode. If the travel speed is the fourth travel speed threshold value or greater, the selection unit 14G selects the third operational mode. The fourth travel speed threshold value is a travel speed threshold value by which it is determined whether to select the first operational mode or the third operational mode. The fourth travel speed threshold value is a value that is determined in advance. Other configuration elements of the lane keeping control apparatus 1G are the same as those of the lane keeping control apparatus 1A.

Hereinafter, a lane keeping control process of the lane keeping control apparatus 1G will be described. The operational mode selection step (S110) of the lane keeping control process of the lane keeping control apparatus 1G is different from that of the lane keeping control process of the lane keeping control apparatus 1A, and other steps are the same as those of the lane keeping control apparatus 1A.

FIG. 11B illustrates the operational mode selection step (S110) of the lane keeping control apparatus 1G. As illustrated in FIG. 11B, in a determination step (S190), the selection unit 14G determines whether the travel speed is less than the fourth travel speed threshold value. The selection unit 14G acquires the fourth travel speed threshold value stored in the storage unit 15G, and performs the determination step. FIG. 12B illustrates an example of a map that is used in the operational mode selection step. As illustrated in FIG. 12B, the fourth travel speed threshold value is $Y_{Q4}$. The fourth travel speed threshold value $Y_{Q4}$ may be a variable. For example, as illustrated in FIG. 12C, the fourth travel speed threshold value $Y_{Q4}$ may be set to a value smaller by the extent of an increase in approaching speed of the vehicle 2. For example, when the approaching speed is zero, the fourth travel speed threshold value is $Y_{Q4}$, and when the approaching speed is $X_{P4}$, the fourth travel speed threshold value is zero. That is, the fourth travel speed threshold value is a Y component of a point on the line $P_4Q_4$. If the travel speed is less than the fourth travel speed threshold value $Y_{Q4}$, the selection unit 14G selects the first operational mode in a selection step (S192). If the travel speed is not less than the fourth travel speed threshold value $Y_{Q4}$, the selection unit 14G selects the third operational mode in a selection step (S194).

As described above, if the travel speed is less than the fourth travel speed threshold value $Y_{Q4}$, the selection unit 14G of the lane keeping control apparatus 1G of the eighth embodiment selects the first operational mode, and if the travel speed is the fourth travel speed threshold value $Y_{Q4}$ or greater, the selection unit 14G selects the third operational mode. That is, if the travel speed is somewhat low, the steering of the vehicle 2 is controlled by a steering force applied to the steering wheel in a state where a brake force is not applied to the wheels. If the travel speed is somewhat high, the steering of the vehicle 2 is controlled by a brake force applied to the wheels such that the vehicle 2, is turned. As such, the apparatus is capable of more quickly changing the direction of the vehicle by turning the vehicle via a difference in brake force between the right and left wheels when the travel speed is somewhat high, in comparison with that when the vehicle 2 is controlled only by a steering force. As a result, the apparatus is capable of reducing a feeling of insecurity to a driver. In addition, the apparatus is capable of reducing a feeling of inconvenience to the driver by not reducing the speed of the vehicle 2 when the travel speed is somewhat low, in comparison with that when a brake force is applied to the wheels every times.

In the lane keeping control apparatus 1G of the eighth embodiment, the fourth travel speed threshold value $Y_{Q4}$ may be set to a value smaller by the extent of an increase in approaching speed of the vehicle 2. In this case, since a brake force is more likely to be applied to the wheels as the approaching speed is increased, the apparatus is capable of further reducing a feeling of insecurity to a driver, and of further reducing a feeling of inconvenience to the driver.

Ninth Embodiment

A lane keeping control apparatus 1H of a ninth embodiment is different from the lane keeping control apparatus 1 of the first embodiment in that the lane keeping control apparatus 1H includes a recognition unit 11H having a function different from that of the recognition unit 11, a selection unit 14H having a function different from that of the selection unit 14, a storage unit 15H storing information different from that stored in the storage unit 15, and the brake unit 42B having a function different from that of the brake unit 42. The rest of the configuration is the same as that in the first embodiment. In the ninth embodiment, description which is duplicated in the first embodiment will be omitted, and mainly the points of difference will be described.

Initially, the points of difference in configuration will be described. The recognition unit 11H is different from the recognition unit 11 in that the recognition unit 11H acquires characteristics of the lane boundary lines. A characteristic of a lane boundary is the form of a lane boundary line. The form of a lane boundary line contains not only shape information such as a solid line, a broken line, or a double line, and color information, but also information indicating whether the lane boundary line is a physical boundary (a curbstone, a wall, an obstacle, or the like) that physically divides a line.

The storage unit 15H stores a characteristic of a lane boundary line and a threshold value while correlating the characteristic of the lane boundary line with the threshold value. The threshold value is the aforementioned threshold value described in the first to eighth embodiments. The storage unit 15H stores a characteristic of a lane boundary line and a threshold value in a table format while correlating the characteristic of the lane boundary line with the threshold value.

If the determination unit 13 determines that lane keeping control is to be executed, the selection unit 14H acquires a threshold value with reference to the storage unit 15H based on a characteristic of a lane boundary line which is acquired by the recognition unit 11H. The selection unit 14H selects an operational mode of the lane keeping control based on the threshold value. Other configuration elements of lane keeping control apparatus 1H are the same as those of the lane keeping control apparatus 1.

Figure 13:
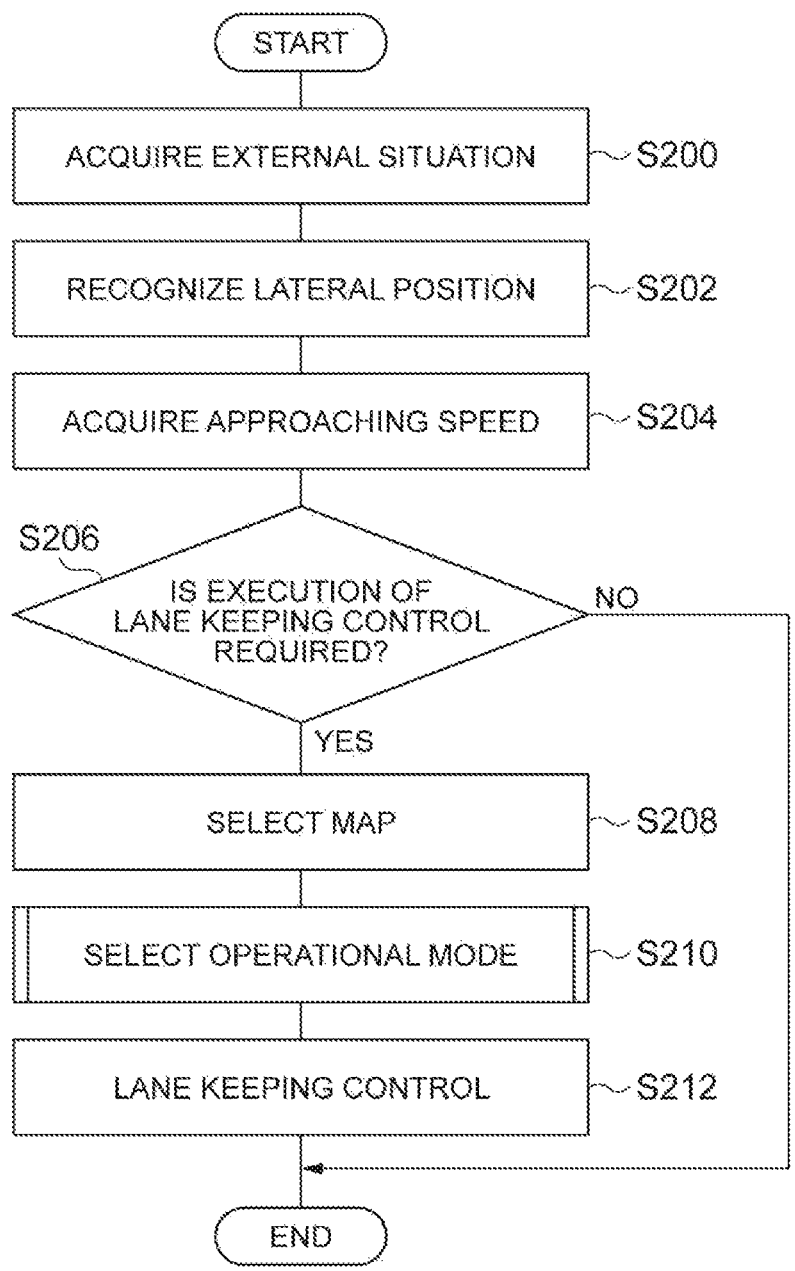
FIG. 13 is a flowchart illustrating an example of a lane keeping control process.

Hereinafter, a lane keeping control process of the lane keeping control apparatus 1H will be described. FIG. 13 is a flowchart illustrating the lane keeping control process of the lane keeping control apparatus 1H. The lane keeping control process illustrated in FIG. 13 starts when a signal to start the operation of the lane keeping control apparatus 1H is acquired.

In an external situation acquisition step (S200), the recognition unit 11H recognizes the positions of the lane boundary lines 101 and 103 of the lane 104 in which the vehicle 2 travels, which are positioned on the front side of the vehicle. The recognition unit 11H also acquires characteristics of the lane boundary lines 101 and 103.

A lateral position recognition step (S202), an approaching speed acquisition step (S204), and a determination step (S206) are the same as the external situation acquisition step (S100), the lateral position recognition step (S102), the approaching speed acquisition step (S104), and the determination step (S106) which are illustrated in FIG. 3.

If it is determined in the determination step (S206) that lane keeping control is to be executed, the selection unit 14H executes a map selection step (S208) prior to an operational mode selection step (S210). The selection unit 14H acquires a map (threshold value) with reference to the storage unit 15H based on the characteristics of the lane boundary lines which are acquired by the recognition unit 11H.

FIG. 14 is a table in which characteristics of lane boundary lines are correlated with map identification numbers. As illustrated in FIG. 14, if the recognition unit 11H specifies the characteristics of the lane boundary lines, the recognition unit 11H is capable of specifying map identification numbers. The map identification number is an identifier that specifies a map.

FIGS. 15A to 15D are examples of maps which are used in the operational mode selection step. FIG. 15A is a map for map identification number "1". FIG. 15B is a map for map identification number "2". FIG. 15C is a map for map identification number "3". FIG. 15D is a map for map identification number "4". These maps contain the threshold values described in the first to eighth embodiments. That is, if a characteristic of a lane boundary line, it is possible to specify a threshold value.

Characteristics of a lane boundary line such as "a yellow solid line", "a double line", and "a physical boundary" are correlated with the map identification number "1,", that is, the map illustrated in FIG. 15A. As such, if a risk index, which increases to the extent that adverse effects are high when departure of the vehicle occurs, is high, the map illustrated in FIG. 15A is to be used.

A characteristic of a lane boundary line such as "a white solid line" is correlated with the map identification number "3", that is, the map illustrated in FIG. 15C. As such, if a risk index is relatively high, the map illustrated in FIG. 15C is to be used. The area of the first operational mode in the map illustrated in FIG. 15C is wider than that in the map illustrated in FIG. 15A. That is, if it is considered that a lane boundary line is correlated with a slight high risk index, the lane keeping control apparatus 1H is capable of performing the lane keeping control, if possible, without applying brakes to the wheels by switching between maps based on a characteristic of the lane boundary line.

A characteristic of a lane boundary line such as "a yellow broken line" is correlated with the map identification number "2", that is, the map illustrated in FIG. 15B. As such, if a risk index is relatively low, the map illustrated in FIG. 15B is to be used. Unlike the map illustrated in FIG. 15A, the third operational mode is not present in the map illustrated in FIG. 15B. That is, if it is considered that a lane boundary line is correlated with a slight low risk index, the lane keeping control apparatus 1H is capable of avoiding a feeling of inconvenience to a driver by not operating the third operational mode via switching between maps based on a characteristic of the lane boundary line.

A characteristic of a lane boundary line such as "a white broken line" is correlated with the map identification number "4", that is, the map illustrated in FIG. 15D. As such, if a risk index is low, the map illustrated in FIG. 15D is to be used. Unlike the map illustrated in FIG. 15C, the third operational mode is not present in the map illustrated in FIG. 15D. That is, if it is considered that a lane boundary line is correlated with a low risk index, the lane keeping control apparatus 1H is capable of avoiding a feeling of inconvenience to a driver by not operating the third operational mode via switching between maps based on a characteristic of the lane boundary line. The area of the first operational mode in the map illustrated in FIG. 15D is wider than that in the map illustrated in FIG. 15B. As such, the lane keeping control apparatus 1H is capable of reducing a feeling of inconvenience to a driver by considerably changing the area of the first operational mode to the extent that a risk index decreases.

Returning to FIG. 13, the selection unit 14H performs the operational mode selection step (S210). The operational mode selection steps described in the first to eighth embodiments can be used as this step. A lane keeping control step (S212) is the same as the lane keeping control step (S112) illustrated in FIG. 3.

As described above, the lane keeping control apparatus 1H of the ninth embodiment is capable of changing a threshold value for changing an operational mode in correspondence with a characteristic of a lane boundary line, for example, a solid line, a broken line, a curbstone, or a wall.

According to knowledge of persons skilled in the art, the present disclosure can be realized in various forms such as various changes or improvements based on the aforementioned embodiments it is possible to realize the following modification examples of the aforementioned embodiments using technical concepts described in the aforementioned embodiments.

[Examples of Modification of Configuration]

The external sensor 31 may further include a radar or a laser imaging detection and ranging (LIDAR) in addition to the camera. The internal sensor 32 may further include an acceleration sensor or a yaw rate sensor in addition to the vehicle speed sensor. The recognition unit 11 may recognize the lateral position of the vehicle 2 in a lane in a state where the lateral position is combined with information from the camera or information acquired via a well-known technique such as GPS. The acquisition unit 12 may acquire an approaching speed via a yaw rate sensor.

EXPLANATION OF REFERENCES 1, 1A, 1B, 1C, 1D, 1E, 1F, 1G, 1H . . . LANE KEEPING CONTROL APPARATUS, 2 . . . VEHICLE, 3 . . . ECU, 11, 11H . . . RECOGNITION UNIT, 12 . . . ACQUISITION UNIT, 13 . . . DETERMINATION UNIT, 14, 14A, 14B, 14C, 14D, 14E, 14F, 14G, 14H . . . SELECTION UNIT, 15, 15A, 15B, 15C, 15D, 15E, 15F, 15G 15H . . . STORAGE UNIT, 16 . . . CONTROL UNIT, 31 . . . EXTERNAL SENSOR (SENSOR), 41 . . . STEERING UNIT, 42, 42B . . . BRAKE UNIT

What is claimed is:

1. A lane keeping control apparatus that performs lane keeping control to prevent departure of a vehicle from a lane, the apparatus comprising:
   a sensor configured to acquire an image in an advancing direction of the vehicle;
   a recognition unit configured to recognize the lateral position of the vehicle in the lane based on the image;
   an acquisition unit configured to acquire an approaching speed that is a lateral speed at which the vehicle approaches a lane boundary line in a width direction of the lane;
   a determination unit configured to determine whether to execute the lane keeping control based on the lateral position;
   a selection unit configured to select an operational mode of the lane keeping control from a plurality of operational modes based on the approaching speed if the determination unit determines that the lane keeping control is to be executed;
   a control unit configured to execute the lane keeping control in the operational mode selected by the selection unit;
   a steering unit configured to apply a steering force to a steering wheel of the vehicle by being controlled by the control unit; and
   a brake unit configured to apply a brake force to wheels of the vehicle by being controlled by the control unit,
   wherein the plurality of operational modes include a first operational mode in which the steering unit is operated such that the direction of the vehicle faces the center of the lane, and in which the brake unit is not operated, and a second operational mode in which the steering unit is operated such that the direction of the vehicle faces the center of the lane, and in which the brake unit is operated such that the speed of the vehicle is reduced, and
   wherein if the approaching speed is less than a first approaching speed threshold value, the selection unit selects the first operational mode, and if the approaching speed is the first approaching speed threshold value or greater, the selection unit selects the second operational mode.

2. The lane keeping control apparatus according to claim 1,
   wherein the first approaching speed threshold value is set to a value smaller by the extent of an increase in travel speed of the vehicle.

3. The lane keeping control apparatus according to claim 1,
   wherein the brake unit is capable of independently applying a brake force to the right and left wheels of the vehicle,
   wherein the plurality of operational modes include a third operational mode in which the steering unit is not operated, and in which the brake unit is operated such that the direction of the vehicle faces the center of the lane, and
   wherein if the approaching speed is the first approaching speed threshold value or greater, and the travel speed of the vehicle is less than a first travel speed threshold value, the selection unit selects the third operational mode instead of the second operational mode.

4. The lane keeping control apparatus according to claim 1,
   wherein the brake unit is capable of independently applying a brake force to the right and left wheels of the vehicle,
   wherein the plurality of operational modes include a third operational mode in which the steering unit is not operated, and in which the brake unit is operated such that the direction of the vehicle faces the center of the lane, and
   wherein if the approaching speed is the first approaching speed threshold value or greater, and is less than a second approaching speed threshold value, the selection unit selects the third operational mode instead of the second operational mode.

5. The lane keeping control apparatus according to claim 1, further comprising:
   a storage unit configured to store a characteristic of the lane boundary line and the first approaching speed threshold value while correlating the characteristic of the lane boundary line with the first approaching speed threshold value,
   wherein the recognition unit also acquires the characteristic of the lane boundary line, and wherein the selection unit acquires the first approaching speed threshold value with reference to the storage unit based on the characteristic of the lane boundary line acquired by the recognition unit.

6. A lane keeping control apparatus that performs lane keeping control to prevent departure of a vehicle from a lane, the apparatus comprising:
   a sensor configured to acquire an image in an advancing direction of the vehicle;
   a recognition unit configured to recognize the lateral position of the vehicle in the lane based on the image;
   an acquisition unit configured to acquire an approaching speed that is a lateral speed at which the vehicle approaches a lane boundary line in a width direction of the lane;
   a determination unit configured to determine whether to execute the lane keeping control based on the lateral position;
   a selection unit configured to select an operational mode of the lane keeping control from a plurality of operational modes based on the travel speed of the vehicle if the determination unit determines that the lane keeping control is to be executed;
   a control unit configured to execute the lane keeping control in the operational mode selected by the selection unit;
   a steering unit configured to apply a steering force to a steering wheel of the vehicle by being controlled by the control unit; and
   a brake unit configured to apply a brake force to wheels of the vehicle by being controlled by the control unit,
   wherein the plurality of operational modes include a first operational mode in which the steering unit is operated such that the direction of the vehicle faces the center of the lane, and in which the brake unit is not operated, and a second operational mode in which the steering unit is operated such that the direction of the vehicle faces the center of the lane, and in which the brake unit is operated such that the speed of the vehicle is reduced, and
   wherein if the travel speed is less than a second travel speed threshold value, the selection unit selects the first operational mode, and if the travel speed is the second travel speed threshold value or greater, the selection unit selects the second operational mode.

7. The lane keeping control apparatus according to claim 6,
   wherein the second travel speed threshold value is set to a value smaller by the extent of an increase in the approaching speed.

8. The lane keeping control apparatus according to claim 6,
   wherein the brake unit is capable of independently applying a brake force to the right and left wheels of the vehicle,
   wherein the plurality of operational modes include a third operational mode in which the steering unit is not operated, and in which the brake unit is operated such that the direction of the vehicle faces the center of the lane, and
   wherein if the travel speed is the second travel speed threshold value or greater, and the approaching speed is less than a third approaching speed threshold value, the selection unit selects the third operational mode instead of the second operational mode.

9. The lane keeping control apparatus according to claim 6,
   wherein the brake unit is capable of independently applying a brake force to the right and left wheels of the vehicle,
   wherein the plurality of operational modes include a third operational mode in which the steering unit is not operated, and in which the brake unit is operated such that the direction of the vehicle faces the center of the lane, and
   wherein if the travel speed is the second travel speed threshold value or greater, and is less than a third travel speed threshold value, the selection unit selects the third operational mode instead of the second operational mode.

10. The lane keeping control apparatus according to claim 6, further comprising:
    a storage unit configured to store a characteristic of the lane boundary line and the second travel speed threshold value while correlating the characteristic of the lane boundary line with the second travel speed threshold value,
    wherein the recognition unit also acquires the characteristic of the lane boundary line, and
    wherein the selection unit acquires the second travel speed threshold value with reference to the storage unit based on the characteristic of the lane boundary line acquired by the recognition unit.

11. A lane keeping control apparatus that performs lane keeping control to prevent departure of a vehicle from a lane, the apparatus comprising:
    a sensor configured to acquire an image in an advancing direction of the vehicle;
    a recognition unit configured to recognize the lateral position of the vehicle in the lane based on the image;
    an acquisition unit configured to acquire an approaching speed that is a lateral speed at which the vehicle approaches a lane boundary line in a width direction of the lane;
    a determination unit configured to determine whether to execute the lane keeping control based on the lateral position;
    a selection unit configured to select an operational mode of the lane keeping control from a plurality of operational modes based on the approaching speed if the determination unit determines that the lane keeping control is to be executed;
    a control unit configured to execute the lane keeping control in the operational mode selected by the selection unit;
    a steering unit configured to apply a steering force to a steering wheel of the vehicle by being controlled b the control unit; and
    a brake unit configured to independently apply a brake force to right and left wheels of the vehicle by being controlled by the control unit,
    wherein the plurality of operational modes include a first operational mode in which the steering unit is operated such that the direction of the vehicle faces the center of the lane, and in which the brake unit is not operated, and a third operational mode in which the steering unit is not operated, and in which the brake unit is operated such that the direction of the vehicle faces the center of the lane, and
    wherein if the approaching speed is less than a fourth approaching speed threshold value, the selection unit selects the first operational mode, and if the approaching speed is the fourth approaching speed threshold value or greater, the selection unit selects the third operational mode.

12. The lane keeping control apparatus according to claim 11,
wherein the fourth approaching speed threshold value is set to a value smaller by the extent of an increase in travel speed of the vehicle.

13. The lane keeping control apparatus according to claim 11, further comprising:
a storage unit configured to store a characteristic of the lane boundary line and the fourth approaching speed threshold value while correlating the characteristic of the lane boundary line with the fourth approaching speed threshold value,
wherein the recognition unit also acquires the characteristic of the lane boundary line, and
wherein the selection unit acquires the fourth approaching speed threshold value with reference to the storage unit based on the characteristic of the lane boundary line acquired by the recognition unit.

14. A lane keeping control apparatus that performs lane keeping control to prevent departure of a vehicle from a lane, the apparatus comprising:
a sensor configured to acquire an image in an advancing direction of the vehicle;
a recognition unit configured to recognize the lateral position of the vehicle in the lane based on the image;
an acquisition unit configured to acquire an approaching speed that is a lateral speed at which the vehicle approaches a lane boundary line in a width direction of the lane;
a determination unit configured to determine whether to execute the lane keeping control based on the lateral position;
a selection unit configured to select an operational mode of the lane keeping control from a plurality of operational modes based on the travel speed of the vehicle if the determination unit determines that the lane keeping, control is to be executed;
a control unit configured to execute the lane keeping control in the operational mode selected by the selection unit;
a steering unit configured to apply a steering force to a steering wheel of the vehicle by being controlled by the control unit; and
a brake unit configured to independently apply a brake force to right and left wheels of the vehicle by being controlled by the control unit,
wherein the plurality of operational modes include a first operational mode in which the steering unit is operated such that the direction of the vehicle faces the center of the lane, and in which the brake unit is not operated, and a third operational mode in which the steering unit is not operated, and in which the brake, unit is operated such that the direction of the vehicle faces the center of the lane, and
wherein if the travel speed is less than a fourth travel speed threshold value, the selection unit selects the first operational mode, and if the travel speed is the fourth travel speed threshold value or greater, the selection unit selects the third operational mode.

15. The lane keeping control apparatus according to claim 14,
wherein the fourth travel speed threshold value is set to a value smaller by the extent of an increase in the approaching speed.

16. The lane keeping control apparatus according to claim 14, further comprising:
a storage unit configured to store a characteristic of the lane boundary line and the fourth travel speed threshold value while correlating the characteristic of the lane boundary line with the fourth travel speed threshold value,
wherein the recognition unit also acquires the characteristic of the lane boundary line, and
wherein the selection unit acquires the fourth travel speed threshold value with reference to the storage unit based on the characteristic of the lane boundary line acquired by the recognition unit.

* * * * *